Feb. 2, 1965 D. H. ANDERSON 3,168,724

COMPUTING DEVICE INCORPORATING INTERRUPTIBLE REPEAT INSTRUCTION

Filed Jan. 22, 1962 22 Sheets-Sheet 1

INVENTOR
DUANE H. ANDERSON
BY Marvin Jacobson
ATTORNEY

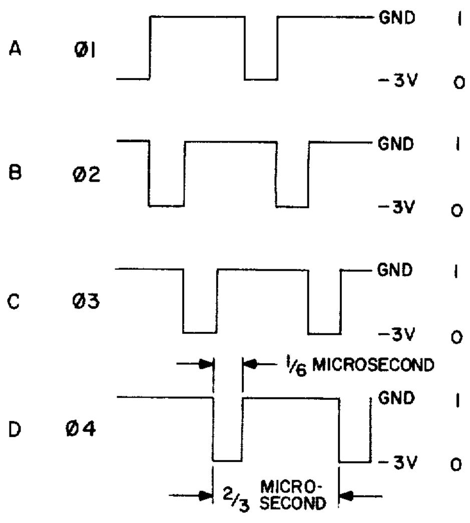
Fig. 2
Fig. 3
| A | B | C |
|---|---|---|
| 1 | 0 | 0 |
| 0 | 1 | 0 |
| 1 | 1 | 0 |
| 0 | 0 | 1 |
Fig. 5
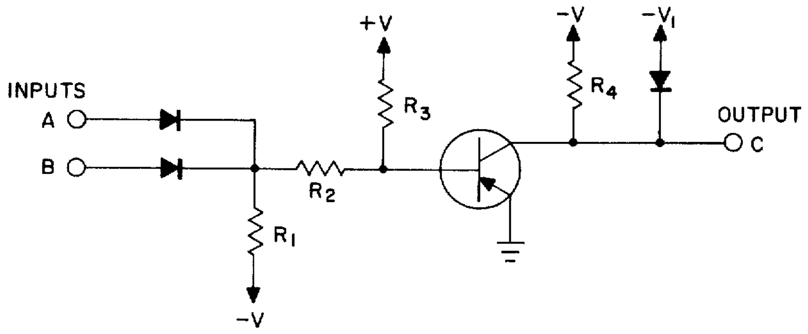
Fig. 4
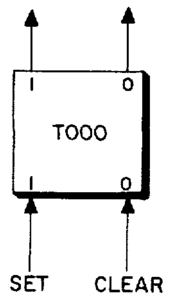
Fig. 6
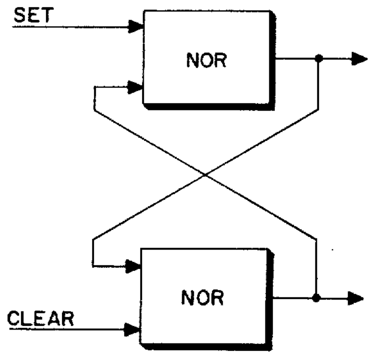
Fig. 7

| TIME SLOTS | CLOCK Ø | $T_0$ SEQ. | $T_2$ SEQ. | $T_3$ SEQ. |
|---|---|---|---|---|
| 4 | 1 | P TO $S_0$, INIT. MEM. 1, SET P DES. FF<br>SET $Z_1$ TO $F_0$ FF, $F_{1a}$ TO $S_0^*$, INIT. MEM. 0* | | |
| | 2 | $Z_0$ TO $X^*$ | | |
| | 3 | | | |
| | 4 | | | |
| 5 | 1 | $F_{0b}$ TO $S_0^*$, INIT. MEM. 0*<br>INIT. $T_3$ SEQ. | | |
| | 2 | IA TO $Z_{0L}^*$ | | |
| | 3 | | | CLEAR $W_1$, $W_2$, $W_3$ |
| | 4 | | | +1 TO $W_3$, P TO $W_1$ |
| 6 | 1 | | | |
| | 2 | CLEAR $F_0$ | | CLEAR P |
| | 3 | $Z_1$ TO $F_0$<br>INIT. $T_0$ | | |
| | 4 | | | |
| 1 | 1 | $F_{0b}$ TO $S_0$, INIT. MEM. 0 | | CLEAR R |
| | 2 | | | IA TO R |
| | 3 | CLEAR $W_1$, $W_2$, $W_3$ | | R TO P |
| | 4 | $F_{0L}$ TO $W_3$, $Z_0$ TO $W_1$ AND $W_2$<br>SET REPEAT SET UP FF | | CLEAR P DES. FF |
| 2 | 1 | $F_{1a}$ TO $S_0^*$, INIT. MEM. 0* | | |
| | 2 | ARITH. TO $Z_0^*$ | | |
| | 3 | | | |
| | 4 | | | |
| 3 | 1 | CLEAR R, CLEAR $Z_1$ TO $F_0$ FF<br>CLEAR $Z_1$ TO X FF | | |
| | 2 | IA TO R | | |
| | 3 | CLEAR $W_3$, $W_2$ TO $W_3$<br>CLEAR $F_1$, INIT. $T_2$ | | |
| | 4 | $F_0$ TO $F_1$ | | |
| 4 | 1 | | 101 TO $S_0$, INIT. MEM. 0<br>CLEAR RPT. IN PROG. FF, P TO Q | |
| | 2 | | | |
| | 3 | | CLEAR $W_1$, $W_2$, $W_3$ | |
| | 4 | | $Z_0$ TO $W_1$ | |

Fig. 8a

| TIME SLOTS | CLOCK Ø | $T_0$ SEQ. | $T_2$ SEQ. | $T_3$ SEQ. |
|---|---|---|---|---|
| 5 | 1 | | 103 TO $S_0$, INIT. MEM. 0<br>ARITH. TO $Z_0$, CLEAR R, CLEAR P | |
| | 2 | | $W_1$ TO R, CLEAR RPT. TERM. FF<br>R TO P | |
| | 3 | | | |
| | 4 | | | |
| 6 | 1 | | | |
| | 2 | | | |
| | 3 | | | |
| | 4 | | | |
| 7 | 1 | | | |
| | 2 | | | |
| | 3 | | | |
| | 4 | | | |
| 8 | 1 | | $F_{1a}$ TO $S_0$,<br>INIT. MEM. 0 | |
| | 2 | | | |
| | 3 | | $Z_0$ TO ARITH., SET RPT. FF<br>CLEAR RPT. SET UP FF | |
| | 4 | | | |
| 9 | 1 | | | |
| | 2 | | | |
| | 3 | | INIT. $T_0$ | |
| | 4 | | | |
| 1 | 1 | $F_{0b}$ TO $S_0$, INIT. MEM. 0 | | |
| | 2 | | | |
| | 3 | CLEAR $W_1$, $W_2$, $W_3$ | | |
| | 4 | $F_{0L}$ TO $W_3$, $Z_0$ TO $W_1$, $W_2$ | | |
| 2 | 1 | | | |
| | 2 | | | |
| | 3 | | | |
| | 4 | | | |

Fig. 8b

| TIME SLOTS | CLOCK Ø | $T_0$ SEQ. | $T_2$ SEQ. | $T_3$ SEQ. |
|---|---|---|---|---|
| 3 | 1 | CLEAR R | | |
| | 2 | IA TO R | | |
| | 3 | CLEAR $W_3$, $W_2$ TO $W_3$ | | |
| | 4 | | | |
| 4 | 1 | R TO $S_1$, INIT. MEM. 1<br>SET $Z_1$ TO X FF | | |
| | 2 | | | |
| | 3 | | | |
| | 4 | | | |
| 5 | 1 | $F_{0b}$ TO $S_0$, INIT. MEM. 0<br>INIT. $T_3$ SEQ. | | |
| | 2 | IA TO $Z_{0L}$ | | |
| | 3 | | | CLEAR $W_1$, $W_2$, $W_3$ |
| | 4 | | | −1 TO $W_3$, P TO $W_1$ |
| 6 | 1 | | | |
| | 2 | | | CLEAR P |
| | 3 | $Z_1$ TO X<br>INIT. $T_0$ | | |
| | 4 | | | |
| 1 | 1 | $F_{0b}$ TO $S_0$, INIT. MEM. 0 | | CLEAR R |
| | 2 | | | IA TO R |
| | 3 | CLEAR $W_1$, $W_2$, $W_3$ | | R TO P |
| | 4 | $F_{0L}$ TO $W_3$, $Z_0$ TO $W_1$, $W_2$ | | (SET RPT. TERM FF IF R=0)<br>CLEAR P DES. FF |
| 2 | 1 | | | |
| | 2 | | | |
| | 3 | | | |
| | 4 | | | |
| 3 | 1 | CLEAR R | | |
| | 2 | IA TO R | | |
| | 3 | CLEAR $W_3$, $W_2$ TO $W_3$ | | |
| | 4 | | | |

Fig. 8c

| TIME SLOTS | CLOCK φ | $T_0$ SEQ. | $T_2$ SEQ. | $T_3$ SEQ. |
|---|---|---|---|---|
| 4 | 1 | R TO $S_1$, INIT. MEM. 1<br>SET $Z_1$ TO X FF | ← BRANCHING POINT (SEE NOTES, FIG. 8e) | |
| | 2 | | | |
| | 3 | [SET RPT. TERM. FF]<br>[SET INT. FF] | | |
| | 4 | | | |
| 5 | 1 | | | |
| | 2 | IA TO $Z_{0L}$ | | |
| | 3 | | | |
| | 4 | | | |
| 6 | 1 | | | |
| | 2 | | | |
| | 3 | INIT. $T_2$, $Z_1$ TO X | | |
| | 4 | | | |
| 7 | 1 | | 103 TO $S_0$, INIT. MEM. 0<br>CLEAR RPT. IN PROG. FF, P TO Q | |
| | 2 | | | |
| | 3 | | CLEAR $W_1$, $W_2$, $W_3$ | |
| | 4 | | $Z_0$ TO $W_1$ | |
| 8 | 1 | | 101 TO $S_0$, INIT. MEM. 0, [INIT. $T_3$]<br>ARITH. TO $Z_0$, CLEAR R, CLEAR P | |
| | 2 | | $W_1$ TO R, CLEAR RPT. TERM. FF<br>R TO P, CLEAR $F_0$ | |
| | 3 | | | [CLEAR $W_1$, $W_2$, $W_3$ |
| | 4 | | INIT. $T_0$ | -1 TO $W_3$, P TO $W_1$ |
| 1 | 1 | | | |
| | 2 | | | CLEAR P |
| | 3 | | | |
| | 4 | | | |
| 2 | 1 | | | CLEAR R |
| | 2 | | | IA TO R |
| | 3 | | | R TO P |
| | 4 | | | CLEAR P DES. FF] |

Fig. 8d

| TIME SLOTS | CLOCK Ø | $T_0$ SEQ. | $T_2$ SEQ. | $T_3$ SEQ. |
|---|---|---|---|---|
| 3 | 1 | | | |
| | 2 | | | |
| | 3 | CLEAR $F_1$ | | |
| | 4 | $F_0$ TO $F_1$ | | |
| 4 | 1 | P TO $S_1$, INIT. MEM. 1, [FIXED ADD. TO $S_1$] SET P DES. FF, SET $Z_1$ TO F FF | | |
| | 2 | | | |
| | 3 | | | |
| | 4 | | | |
| 5 | 1 | INIT. $T_3$ SEQ. | | |
| | 2 | | | |
| | 3 | | | CLEAR $W_1$, $W_2$, $W_3$ |
| | 4 | | | +1 TO $W_3$, P TO $W_1$ |
| 6 | 1 | | | |
| | 2 | CLEAR $F_0$ | | CLEAR P |
| | 3 | $Z_1$ TO $F_0$, INIT. $T_0$ | | |
| | 4 | | | |
| 1 | 1 | | | CLEAR R |
| | 2 | | | IA TO R |
| | 3 | | | R TO P |
| | 4 | | | CLEAR P DES. FF |

NOTES:

1. IF $R \neq 0$ AND NO INTERRUPT HAS OCCURRED, REPEAT FROM PREVIOUS TIME SLOT 4.1.
2. IF $R \neq 0$ AND INTERRUPT OCCURS, CONTINUE AND INCLUDE BRACKETED SIGNALS.
3. IF $R = 0$ AT PREVIOUS TIME SLOT 1.4, CONTINUE BUT DO NOT INCLUDE BRACKETED SIGNALS.

Fig. 8e

Feb. 2, 1965 D. H. ANDERSON 3,168,724

COMPUTING DEVICE INCORPORATING INTERRUPTIBLE REPEAT INSTRUCTION

Filed Jan. 22, 1962 22 Sheets-Sheet 8

Feb. 2, 1965 D. H. ANDERSON 3,168,724

COMPUTING DEVICE INCORPORATING INTERRUPTIBLE REPEAT INSTRUCTION

Filed Jan. 22, 1962 22 Sheets-Sheet 12

Feb. 2, 1965 D. H. ANDERSON 3,168,724

COMPUTING DEVICE INCORPORATING INTERRUPTIBLE REPEAT INSTRUCTION

Filed Jan. 22, 1962 22 Sheets-Sheet 21

3,168,724
Patented Feb. 2, 1965

3,168,724

COMPUTING DEVICE INCORPORATING INTERRUPTIBLE REPEAT INSTRUCTION

Duane H. Anderson, Roseville, Minn., assignor to Sperry Rand Corporation, New York, N.Y., a corporation of Delaware Filed Jan. 22, 1962, Ser. No. 167,728
6 Claims. (Cl. 340—172.5)

This invention relates to high speed electronic digital computers. More particularly, this invention relates to computers of the internally stored program type wherein the instructions comprising the program are stored in preselected addresses of a random-access memory and are accessed in specified sequence to perform data processing operations.

In computers of the nature described above a large amount of computer operation time is consumed in referencing the memory section in order to call out the instructions which control the operation of the computer and the operands upon which the operations are performed. Furthermore, as the data processing continues, reference to the memory section is also required in order to restore results of various operations. Because of the present day demand of increased speed in data processing, various features have been incorporated into digital computers to compensate for the operational time required in the memory references. It should be pointed out at this juncture that the term "memory reference" refers to a cycle of operation which includes the reading-out of stored information and the rewriting of information in that same memory location. In other words, in relation to destructive read-out, when in formation is read-out from a given address of memory it is no longer available from that address and therefore if it is to be re-utilized subsequently, it must be restored during the memory reference cycle. Additionally, in some instances during a single memory reference the information that is restored or written during the memory reference cycle may be different than the information read-out from that address location. In any event a memory reference refers to a complete memory cycle which includes both read-out and write or restore.

Some computers incorporate the multiple addressing technique in which the instruction word contains more than a single address with each address referencing a separate independent memory section. For example, in a two address system an instruction word for controlling an addition operation woul dinclude one adddress from which a first operand, the augend, would be obtained and another address would reference a separate memory section to call out a second operand, the addend, so that both operands can be obtained concurrently thereby reducing memory reference cycle time. Other computers have incorporated non-destructive read-out systems in their memory sections to eliminate the requirement of the restore operation in the read-write cycle of the memory reference. However, present day techniques are such that large capacity random-access high speed memory systems of the non-destructive read-out type have not been available. Additionally, it is often desired to alter the stored information. Still other computers have incorporated the instruction overlap technique so that when an instruction is obtained from memory during the read portion of a memory reference cycle, the function to be performed under control of that instruction is initiated while the instruction is being restored in the memory. While this first function is being performed by the computer, another instruction can be read-out of the memory after the restore portion of the memory reference cycle and its function can be initiated so that a plurality of instructions are being performed simultaneously. This latter method, of course, requires duplication of many registers and control circuitry in the computer and also requires numerous checking circuits and lock-out circuits to insure that not more than a single instruction is operating on the same data at any given time.

In the instant invention a digital computer incorporates a system which effectively provides a combination of the multiple addressing technique and the instruction overlap technique described above. The computer includes a main memory and a control memory. The former is a large capacity, random-access memory while the latter is a relatively small capacity, random-access memory but which has a memory reference cycle with a time duration of only a fraction of the memory reference cycle for the larger capacity memory. In the exemplary embodiment to be subsequently described in greater detail the control memory has a memory reference cycle of ⅙ the time duration of the large capacity memory reference cycle, no limitation thereto intended. Each of the memories is independent so that reference to both can be made simultaneously. The format of the instruction word is such that portions of the coded permutations comprising the instruction word are utilized to reference the control memory while another portion of the instruction word contains the address of a memory location in the large capacity memory. Since the memory reference cycle time for the control memory is only a fraction of that for the large capacity memory, during the interval of time required for a reference to the large capacity memory multiple references to the control memory can be made. In a given instruction word single digit positions or groups of digit positions hereinafter referred to as designators contain coded permutations of addresses in the control memory in which are stored information either in the form of operands to be utilized in conjunction with the information obtained from the large capacity memory or in the form of further control information which may modify or supplement the function of the instruction word as determined by the operation coded permutations of the instruction word. In most cases during the reference to the large capacity memory the plurality of references to the control memory provides both operands and control words. This system not only serves to increase the effective speed of the digital computer but additionally provides a great versatility in the programing of the computer data processing operations.

Since throughout the remainder of this specification there will be continual reference to the instruction words and the designators contained in the instruction words, it is appropriate at this juncture to briefly describe the format of a typical instruction word and label the designators contained therein. The instruction word shown immediately below is a 36 bit binary word with the leftmost bit position, 35, being the most significant bit position and the rightmost bit position, 00, being the lowest order bit positoin. Since this is a binary word each of the bit positions has two state capabilities, "1" or "0," and each bit or group of bits corresponding to a given designator is sectioned off and labeled with small letter designations.

INSTRUCTION WORD

| *f* | *j* | *a* | *b* | *h* | *i* | *u* |
|---|---|---|---|---|---|---|
| 35-30 | 29-26 | 25-22 | 21-18 | 17 | 16 | 15-00 |

The six highest order bits 35–30 labeled *f* comprise the coded permutations of the function or operation code of the instruction word. The coding in these six bits determines the basic operation of the instruction word and the translation of the contents of the six bits controls the logic circuitry of the computer to effect the coded function. The next lower four bits, 29–26, comprise the *j* designator, the use of which depends upon the particular instruction. Where required in the specification, in describing the instant invention the various portions of the instruction word will be described in greater detail. For the purposes of the instant invention, the four bits, 25–22, comprising the *a* designator, always refer to a location in the high speed control memory of the computer. The four bits contained in the bit locations 21–18, labeled *b* designator, also contain the coded representations of addresses in the control memory. The *h* designator in bit position 17 and the *i* designator in bit position 16 are respectively the incrementation designator and the indirect addressing designator. The sixteen lowest order bit positions, 15–00, comprise the coded permutations of a base address of an operand or in some instructions represent the operand itself. This latter group of sixteen bits is labeled *u*.

As is well known in the art, in an internally stored program computer the instruction words which control the programmed operation of the computer are generally placed in successive storage location in memory, that is, successively ascending addresses, and each is read-out of the memory in succession and placed in a function register, F, to provide the control of the logical circuitry of the computer to perform the data processing operations. As each instruction is obtained in sequence from memory, the contents of a program address register, P, are incremented to hold the address of the next instruction. When the function designated by the operation code portion of the instruction word, *f*, has been performed, the instruction word is then replaced in the F register by the next successive instruction word and this continues to the completion of the program. In many instances, the *u* portion of the instruction word contains the address of the location of an operand on which an operation is to be performed in accordance with the *f* portion of the instruction word. To obtain the operand from memory so that it may be transmitted to the portion of the computer in which it may be operated upon, for example to the arithmetic section, a memory reference cycle is required. Therefore, it can be seen that in all cases each instruction word requires at least one memory reference, the memory reference utilized to obtain the instruction word itself and place it in the F register and in some instances at least an additional memory reference is required. In the computer in which the instant invention is utilized, during the interval of time required for a memory reference to the large capacity, comparatively slow speed memory, a plurality of references are made to the smaller capacity, high speed control memory. For example, when an instruction word is read-out of the large capacity memory and is available in the F register, during the interval of time required for the rewrite portion of the memory reference cycle, a memory reference to an address as designated by the *b* designator of the instruction word can be made to the control memory and the information read-out of the control memory is utilized to supplement the information contained in the instruction word. Further, during this same interval of time other references to the high speed control memory may be made. Additionally, it should be noted that during the memory reference to obtain a new instruction word, memory reference to the control memory at an address as designated by the *a* designator of the previous instruction, which is still available, may be made and in this manner obtain a type of operation similar to instruction overlap without duplication of registers. Additionally, if the instruction in the F register requires a further memory reference in order to obtain an operand and this is a reference to the large capacity memory, multiple references to the high speed control memory can be and are effected, usually under control of the *a* or *b* designators, of the instruction word presently in the F register. The foregoing is only intended to briefly indicate the versatile capabilities of the computer incorporating an addressable high speed, random-access, control memory in conjunction with another addressable, large capacity, comparatively slow speed, random-access memory.

As previously stated, the computer operation is programmed by a series of instructions located in successive storage addresses and which are performed in proper sequence. Often, of course, it is required to break this successive sequential operation by skipping some instructions or by jumping out of the sequential addressing mode into certain sub-routines or by repeating certain instructions for a predetermined number of times or until the occurrence of a preselected event or series of events. The instant invention relates to operations of the latter type as they are implemented in a digital computer of the type briefly described above which incorporates a high speed, relatively small capacity control memory in conjunction with a large capacity, comparatively slow speed memory. In many computers repeat operations are implemented by including in the instruction word a designator which signifies whether or not the function as designated by the *f* portion of the instruction word should be repeated. In many instances not only does the designator indicate whether or not a repeat should be performed but also the number of times that the function should be repeated and after each repeated operation, the designator is sensed to determine if the repeat should be terminated. If the termination of the repeat is dependent upon some other condition this has to be implemented by other instructions which sense the condition and so terminate the repeat and if the condition had not occurred to allow the repeat to continue. In the instant invention the *f* portion of the instruction word itself signifies the function of a repeat operation. The function code contained in the *f* portion of the instruction word further controls the steps required to set up the repeat function and because of the capability of multiple references to the control memory during a single reference to the large capacity memory the sensing for termination of the repeat by determining that the repeat has been performed the required number of times or that the condition for termination has been met is all effected substantially simultaneously with the operation of each of the repeated functions.

Therefore, it is a general object of this invention to provide a new and improved controllable repeating function in a digital computer.

It is a more specific object of this invention to provide a controllable repeating function for a digital computer in which the control for designating the repeat is implemented in the function code itself.

Still a further object of this invention is to provide a controllable repeating function for a digital computer with increased operational speed.

Yet another object of this invention is to attain the object immediately above by implementing the test for termination of the repeating function such as to be operational substantially simultaneously with the functional operation.

Another object of this invention is to achieve the object immediately above without requiring additional instructions.

Once a repeating function is initiated it continues automatically until the conditions for termination have been met and at that time, the normal computer program is continued in its predetermined fashion. The computer must provide the means for providing the storage location of the program instruction which is immediately subsequent to the termination of the repeating function, that is, the storage address of the next instruction of the normal program. In the course of the repetitive operation of the repeating function it is sometimes necessary to interrupt the repeat temporarily so that other portions of the computer or the computing system have access to the computer registers and control memory. For example, peripheral equipment which constitutes a portion of the computer system may require the establishment of immediate communication with the computer during the operation of the repeating function. This requirement may be of a high priority nature so rather than await the termination of the repeating function the repeat is interrupted to allow the establishment of the communication. Interrupts from other sources are also possible and the interrupt for establishing communication with peripheral equipment is only intended to be illustrative. Not only must the repeating function be interruptible, but there is also a requirement that once the operation or series of operations which must be performed in response to the interrupt have been performed, the continuation of the program must be established by re-initiating the interrupted repeating function at the same point at which it had been interrupted, that is, where it had been temporarily discontinued.

Therefore, it is an object of this invention to provide, for a digital computer, an interruptible repeating function.

Still a further object of this invention is to provide means for temporarily interrupting a repeating function in a digital computer and for re-initiating the repeating function once the cause of the interrupt is no longer present.

Yet another object of this invention is to re-initiate an interrupted repeating function at the same juncture at which it had been interrupted.

Still another object of this invention is to provide for continuation of the stored program in proper sequence upon termination of a repeat function.

Yet another object of this invention is to attain the object immediately above with an interruptible repeat function.

In providing the objectives above it can be seen that if a repeating function is interrupted temporarily and subsequently allowed to continue when the cause for interruption is no longer effective without the requirement for reestablishing the repeating function back at its origin, that considerable operation time is saved in the programmed data processing. Therefore, another object of this invention is to provide means for conserving operational time in a digital computer which includes interruptible repeating functions in its data processing program.

These and other more detailed and specific objects will be disclosed in the course of the following specification, reference being had to the accompanying drawings, in which:

FIG. 2 shows exemplary clocking pulses utilized in said computing device;

FIG. 3 is the block symbol for the basic logical NOR circuit used in the exemplary embodiment of this invention;

FIG. 4 is the electrical schematic of the NOR logic circuit;

FIG. 5 is the truth table for the NOR;

FIG. 6 is the block symbol for a flip-flop;

FIG. 7 is a block diagram of an embodiment of a flip-flop which comprises two cross-coupled NOR circuits;

FIG. 8 is a table listing various essential developed signals in time relationship;

Figure 1:
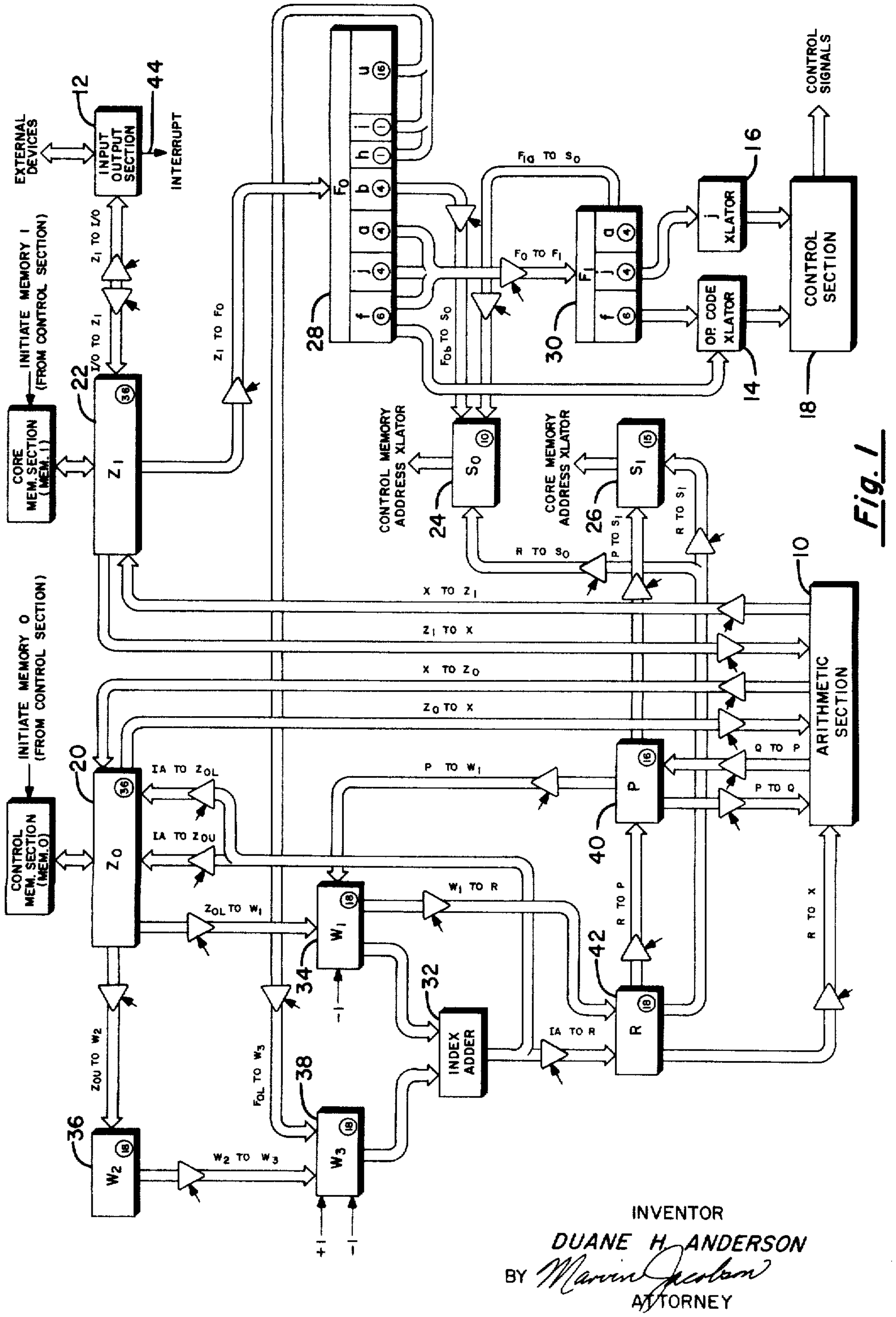
FIG. 1 is a block diagram of an embodiment of a computing device incorporating the teachings of the instant invention.

Although it will become obvious in the course of reading the specification that the teachings of this invention are applicable to digital computers in general, the description contained herein will be limited to binary computers. In the course of the description of the instant invention and in particular when referring to exemplary instruction words, octal representations may be utilized in lieu of the more lengthy binary representations. It is well known that a group of three bits, binary digits, comprise a single octal digit thereby making interchangeable and readily understood the use of octal designation in lieu of binary representations. For example, a six bit binary word of 110001 is represented by octal 61.

In the specification reference will be made to data signals and control signals as well as data transmission paths and control signal transmission paths. Although the control signals and the signals representing data are identical in form, they are functionally different. These differences will become obvious in the course of reading the specification. However, at this juncture it may be beneficial to point out the basic difference. The data can be considered as words, such as operands or instruction words, which represent information and in general are transmitted between registers as entire words or as portions of entire words and the digits as a group comprise the information. The control signals are not information representing signals but are utilized primarily to gate the transmission of the data signals between registers and to properly sequence the functional operations of the computer. It should be noted that in some instances data is translated to become a control signal. Another type of signal which can be considered in the same realm as a control signal is the clock signal which serves to synchronize functional operations of the computer. The primary difference between the clock or timing signals and the other control signals is that the former repetitively reoccur in the same time relationship irrespective of the function to be performed by the computer, whereas the latter may or may not occur depending upon said functional operation. For example, in a computer operation which requires no reference to the arithmetic section, arithmetic control signals, of course, will not be developed although clock signals will still be present. It should be pointed out that in many instances in order to control the proper sequencing of operations of the computer, control signals are dependent upon the occurrence of a clocking signal in addition to the function to be effected by the computer.

The basic logical element which is utilized in the embodiment of this invention is a NOR circuit which is represented by a rectangular block as shown in FIG. 3. The electrical circuitry of a typical NOR circuit is shown in FIG. 4 and comprises diode OR inputs into a single transistor amplifier-inverter, the operation of which is well known in the art. The truth table for the NOR circuit is shown in FIG. 5 and logically can be described as outputting a "0" if any input thereto is a "1" and outputting a "1" only if all inputs into the diode OR are "0's." In the embodiments shown a "1" is represented by a D.C. voltage level of approximately ground or zero volts and a "0" is represented by a D.C. voltage level of approximately −3 volts. This, of course, is only exemplary and not limitive and is only a matter of choice depending upon the type of logic element utilized and the circuitry of said logical element. In the figures, each of the individual OR inputs into a NOR element, where more than a single input is required, are represented by individual input lines thereto.

As shown in FIG. 6, the flip-flops are represented by square blocks in the figures. The flip-flop comprises a pair of cross-coupled NOR elements as shown in FIG. 7. Each of the flip-flops includes a 1 and a 0 input side and a corresponding 1 and 0 output side. When in the 0 state the flip-flop outputs a "1" from the 1 side and a "0" from the 0 side, while in the "1" state the flip-flop outputs a "0" from the 1 side and a "1" from the 0 side. Equating this to the reset and the set condition respectively, the flip-flop outputs a "0" from the 1 side when in the set condition and a "0" from the 0 side when in the reset or cleared condition. To set a flip-flop then, a "1" must be fed into the 1 or set input side and to clear the flip-flop, a "1" must be fed into the 0 or clear input side. Although in actual practice, as stated previously, the flip-flop consists of a pair of cross-coupled NOR circuits each having a plurality of OR inputs as required, for ease in explanation and understanding the OR inputs into the flip-flop are shown as multiple inputs into a block appropriately labeled OR and only a single input from the OR into the flip-flop is shown.

FIG. 1 shows in block diagram form an embodiment of a computing device including the portions required for implementation of the instant invention. In general, each of the rectangular blocks in FIG. 1 represents a binary register, each one of which is appropriately labeled with a letter and, where necessary, a subscript number designation. The exceptions to this are those areas which are blocked off but which are intended to include a complete section but since the detailed contents of these sections are not considered pertinent to the instant invention, the individual portions of each of said sections are not shown. These latter are the Arithmetic Section 10 and the Input-Output Section 12 both of which are essential to most computing devices but the internal operation of which is not pertinent to the instant invention. The Arithmetic Section 10 is utilized to perform the arithmetic operations as required by the computing device and the Input-Output Section 12 is utilized for communication between the computing device and external or peripheral devices. The other three boxes which are obviously not registers are the *f* Code Translator 14, the *j* Translator 16 and the Control Section 18 for developing control signals. Translators are well known in the art and their function is to translate the coded representations contained in the corresponding sections of the F registers and to output signals into the Control Section 18 in accordance with said coded representations. In response thereto the Control Section outputs control signals which are utilized to control the functional operations of the computing device. The development of the control signals pertinent to the instant invention by the Control Section 18 will be subsequently described in greater detail.

The registers shown in FIG. 1 are of any type well known in the art and basically comprise a plurality of flip-flops with said flip-flops utilized for temporary storage of a bit of information in corresponding digit orders. The data or information transmission paths between registers are appropriately labeled in FIG. 1 and are shown in cable form to indicate that all transmission is done in a parallel mode, that is, all bits of a register or portions thereof are transmitted simultaneously between the registers. This is to distinguish it from a serial mode of transmission in which the bits are sequentially transmitted in corresponding digit order from one register to another. The means for selective gating of the transmission paths between registers is represented in FIG. 1 by a triangular block through which each of the transmission lines passes. Although only a single gate is shown for each transmission path, it actually represents the total number of gates which would be required depending on the number of bits being transmitted between registers. The direction of transmission of the information is from the base toward the apex of the triangularly represented gate and the additional signal input to one side of the gate is the control signal which enables the gates to allow the transmission of the data.

To aid in the understanding of the operation of the instant invention there will now be explained the unique associations and functional operations of some of the registers shown in FIG. 1. Registers $Z_0$ and $Z_1$, 20 and 22, respectively, are each associated respectively with the Control Memory Section and the Core Memory Section of the computer. These are the data transfer registers intermediate the memory sections and the other registers and sections of the computer. Information which is readout of the respective memory sections, or stored into the respective memory sections, passes through said registers. Also associated with the memory sections are the $S_0$ and the $S_1$ registers, 24 and 26, respectively. These are the Storage Address Registers which contain the coded representations of the address locations in the respective memory sections to which information is to be stored or from which information is to be called out. The $S_0$ register is the storage address register for the Control Memory Section and the $S_1$ is the storage address register for the Core Memory Section. The $F_0$ register 28 is the instruction word register or function register. Its purpose is to temporarily store the coded instruction words as they are obtained from memory in the normal program operation. Since, as previously described, the instruction word comprises a plurality of designators, each of said designators made up of a group of bits within the instruction word, the $F_0$ register is shown to be divided up in accordance with said designators. From FIG. 1 it can be seen that each group of bits comprising a particular designator can be transferred from the $F_0$ register to other registers as said individual groups. The number of bits comprising a given designator are shown in $F_0$ in each of the respective designator sections and are distinguished by being circled. The $F_1$ register 30 can be considered to be a second level of temporary storage for a portion of the instruction word contained in the $F_0$ register. The upper portion of the instruction word in the $F_0$ register 28, comprising the *f*, *j* and *a* designators, is transmitted to the $F_1$ register 30 so that a new instruction word may be placed in the $F_0$ register while a portion of the previous instruction word is still available to provide the control required in completing the functional operation of the computer in accordance with said previous instruction. This will be explained subsequently in greater detail. It should be noted that the only data transmission path into the $F_0$ register is from the $Z_1$ register to indicate that all of the instruction words come from the Core Memory Section and none from the Control Memory Section.

The data transmission paths between the various registers in FIG. 1 will now be described. The functional operation of the said registers will become apparent in most cases from this description. Where a more detailed explanation is deemed necessary further description will be subsequently included. In order to insure that all the data transmission paths are fully described, the data inputs to each of the registers will be utilized since each of these inputs is an output from some other register. It should be noted that in FIG. 1 all of the transmission paths are symbolically described so that the figure is self-descriptive. However, in order to insure sufficient understanding of the operation, this portion of the description is included.

The $Z_0$ and $Z_1$ registers, 20 and 22, respectively, have inputs from the respective memory sections wherein data which is previously stored in said memory sections may be transferred from storage to the operational sections of the computer. Another input to the $Z_1$ register is from the Arithmetic Section 10 via the transmission path labeled X to $Z_1$. This indicates that data can be transmitted from the X register in the Arithmetic Section to said $Z_1$ register. This provides the path by which results of arithmetic operations may be stored away in a memory section for subsequent use. The third and last input to the $Z_1$ register is from the Input-Output section 12 and provides the path for data being transmitted from an external device to the memory section either in the form of instruction words or operands or both. The $Z_0$ register 20 is the data transfer register for the Control Memory Section and, as with the $Z_1$ register, there is a first input to the $Z_0$ register from the Control Memory Section to effect transfer of stored data in said section to various registers within the computer. A second input to the $Z_0$ register is from the Arithmetic Section 10 and the transmission path is labeled A to $Z_0$ indicating the transmission path for results of arithmetic operations which are to be stored in the Control Memory Section. It has been found advantageous to treat the contents of the $Z_0$ register in many instances as two separate equal portions, $Z_0$ lower and $Z_0$ upper designated respectively $Z_{0L}$ and $Z_{0U}$. Since the $Z_0$ register is 36 bits, each of the uppe rand lower halves comprises 18 bits of the $Z_0$ register. A third input to the $Z_0$ register is from the Index Adder 32 via the transmission path labeled IA to $Z_{0U}$. This provides a path for transmitting the output of the Index Adder to the upper portion of the $Z_0$ register. The fourth input to the $Z_0$ register is also from the Index Adder 32 and is the path labeled IA to $Z_{0L}$ for transmitting the output of the Index Adder to the lower half of the $Z_0$ register.

The three registers $W_1$, $W_2$ and $W_3$ 34, 36 and 38, respectively, are used primarily in conjunction with the Index Adder 32. The input to register $W_2$ is over transmission path labeled $Z_{0U}$ to $W_2$ and provides the path for transmitting the upper half of the $Z_0$ register to the $W_2$ register. The $W_1$ register 34 has a first input for transmitting the lower half of the contents of the $Z_0$ register to the $W_1$ register over the transmission path labeled $Z_{0L}$ to $W_1$ and a second input from the P register 40 whereby the output of the P register is transmitted to the $W_1$ register over the transmission path labeled P to $W_1$. Another input to $W_1$ is shown as a $-1$ to indicate that means are provided to set the $W_1$ register to a condition such that its contents is equal to $-1$. $W_3$ register 38 likewise has two primary data transmission input paths, a first being from register $W_2$ over the path labeled $W_2$ to $W_3$ and the second being from the $F_0$ register 28. The latter transmission path provides the means for transmitting the lower portion of the contents of the $F_0$ register, which includes the portions designated *u*, *i* and *h* from the $F_0$ register to the $W_3$ register over the path labeled $F_{0L}$ to $W_3$. The $W_3$ register also includes inputs designated $+1$ and $-1$ which, as similar to the $W_1$ register, indicate the means for setting the contents of the $W_3$ register to said values. The Index Adder 32 has two input paths, one being from the $W_1$ register 34 and the other being from the $W_3$ register 38. The Index Adder is an adder of any type well known in the art and outputs a result which is equal to the sum of the contents of $W_1$ and $W_3$. The transmission paths from $W_1$ and $W_3$ to the Index Adder are not gated since control signals are used to selectively gate the inputs to said registers and the output from the Index Adder to other registers. The R register 42 has a first input from the Index Adder over transmission path labeled IA to R to receive the resulting sum as developed by the Index Adder. The other input to the R register is directly from the $W_1$ register 34 and is appropriately labeled $W_1$ to R.

The P register 40 has a first input from the R register 42 via transmission path labeled R to P and a second input from the Arithmetic Section 10 via the transmission path labeled *Q to P*. The latter indicates transmission of data from the Q register in the Arithmetic Section to the P register and is utilized to transfer the results of certain arithmetic operations from the Arithmetic Section to the P register.

The remaining registers in FIG. 1 are the $S_0$ register 24 and the $S_1$ register 26 which, as previously stated, are the storage address registers respectively for the Control Memory Section and the Core Memory Section. The $S_0$ register has a first input path from the R register 42 via the transmission path labeled R to $S_0$. A second input to the $S_0$ register is from the $F_0$ register 28 and provides the path for transmitting the coded permutations of the *b* designator as contained in the $F_0$ register to the $S_0$ register via the transmission path labeled $F_{0b}$ to $S_0$. The final input to the $S_0$ register provides the means for transmitting coded permutations of the *a* designator contained in the $F_1$ register 30 to the $S_0$ register via the transmission path labeled $F_{1a}$ to $S_0$. The $S_1$ register 26 has two input paths, one from the R register 42 labeled R to $S_1$ and the other from the P register 40 labeled P to $S_1$.

To include all of the data transmission paths into and out of the various registers, there remain those paths which do not constitute inputs to registers but which are inputs to other sections of the computer. The R register 42 has an output data transmission path to the Arithmetic Section 10 via the path labeled R to X and provides the means for transmitting the contents of the R register to the X register in the Arithmetic Section whereby arithmetic operations may be performed on these contents. The P register, 40, contents can likewise be transmitted to the Arithmetic Section 10 via the transmission path labeled P to Q whereby the P contents are transmitted to the Q register of the Arithmetic Section for arithmetic operations to be performed thereon. The $Z_1$ register 22 has an additional output transmission path for transmitting the data therefrom to the Input-Output Section and for clarity this path is shown to be the same as the path for transmitting data from the Input-Output Section into the $Z_1$ register. Further, data is transmitted from the memory sections to the Arithmetic Section via the transmission paths labeled $Z_0$ to X and $Z_1$ to X. The inputs to the $F_0$ register and the $F_1$ register were previously described as well as the output from the $F_1$ register for transmitting the coded permutations of the *f* designator into the code translator 14 and for transmitting the coded permutations of the *j* designator into the *j* translator 16. The results of these translations are transmitted to the Control Section 18 to develop control signals which will be described subsequently in greater detail.

At this juncture it is appropriate to describe a few typical examples for use of the Index Adder in conjunction with its associated registers. In a first exemplary case the lower half of the $Z_0$ register is transmitted to the $W_1$ register while the lower portion of the contents of the $F_0$ register 28 are transmitted to the $W_3$ register via path labeled $F_{0L}$ to $W_3$. The $W_1$ and $W_3$ contents are again added in the Index Adder 32 and in this instance are transmitted to the R register 42 via the transmission path labeled IA to R. The contents of R and then transmitted to the P register 40 via transmission path labeled R to P and from there to the $S_1$ register 26 via transmission path P to $S_1$. When the contents of the $Z_0$ register is an address modifier word obtained from a storage location designated by *b*, there is effected a modification of the base address, *u*, of an instruction contained in the $F_0$ register by adding thereto the lower half of the word obtained from the Control Memory Section and by transmitting the results to the Storage Address Register for the Core Memory Section.

In a second exemplary case assume that the $Z_0$ register 20 still contains the 36 bit address-modifier word. With the appropriate control signals available in the proper sequence, the upper half of the contents of the $Z_0$ register will be transmitted to the $W_2$ register 36 via the transmission path $Z_{0U}$ to $W_2$ and the lower half of the contents of the $Z_0$ register will be transmitted to the $W_1$ register 34 via the path labeled $Z_{0L}$ to $W_1$. From the $W_2$ register the upper half of the contents of the $Z_0$ register will be transmitted to the $W_3$ register 38 via the transmission path $W_2$ to $W_3$. The outputs of the $W_1$ register and the $W_3$ register are combined in the Index Adder 32 with the resulting sum outputted therefrom transmitted back to the $Z_{0U}$ register via the transmission path labeled IA to $Z_0$ upper and IA to $Z_{0L}$ lower. In this manner there is provided the means for self-modification of the address-modifier word stored in the Control Memory Section by adding the upper half of said word to the lower half of said word and transmitting the result back to the Control Memory Section through the $Z_0$ register for subsequent restorage.

A third exemplary case is the incrementation of the contents of the P register 40. In the internally-stored program type of computer the P register is generally designated the program address register and in the normal course of program operation generally the contents thereof designates the address from which the next instruction of the program should be obtained. The contents of the P register are generally continually incremented by one in order to advance the program address register to the next sequential address. To effect this the contents of the P register 40 are transmitted to the $W_1$ register 34 via transmission path P to $W_1$ and the $W_3$ register is set to +1. Through the Index Adder 32 the contents of the P register which now appears in $W_1$ is incremented by one from the $W_3$ register and the output from the Index Adder 32 is transmitted to the R register 42. From R the incremented result is transmitted to the P register so that now the contents of the P register are incremented by one. The foregoing exemplary cases obviously are not intended to be descriptive of all the possibilities available for the use of the Index Adder or any of the registers but are only intended to be illustrative.

Prior to a more detailed description of the operation of the device as shown in FIG. 1, a brief description of the two memory sections utilized in conjunction with the circuit of FIG. 1 is beneficial. The Core Memory Section, sometimes referred to as memory 1, is an addressable, random-access, coincident-current, destructive read-out memory which is well known in the art. In a typical case the memory section comprises 65,536 addressable registers of 36 stages each, with each stage being a magnetic bistable core for storing binary representations of a corresponding digit value. The memory section includes control means for selectively reading information out of the memory and storing information therein. The only control signal required to be transmitted to the memory section in order to effect access to the memory section is a signal which initiates the memory cycle. Once the memory cycle is initiated, the memory is accessed in a series of sequential steps through a complete memory reference cycle. The reference cycle includes in sequential order reading the information stored at the address as designated by the coded permutations contained in the $S_1$ register, transmitting this information in a parallel mode of 36 bits simultaneously to the $Z_1$ transfer register, and finally restoring into the same address location the information previously read-out earlier in the cycle. Where it is desired to store new information into the memory, during the read portion of the memory reference cycle the previous data stored at the address location is not allowed to be transmitted to the $Z_1$ register which now contains the new information to be stored. Since the reading of the stored information is a destructive read-out, all of the cores at that specified address location are therefore in the cleared or "0" state so that during the write portion of the memory reference cycle the new contents of the $Z_1$ register are written into the previously cleared address memory location. In any event, access to the memory 1 section entails a complete memory reference cycle including both reading and writing.

The control memory, referred to interchangeably as memory section 0, preferably comprises a plurality of magnetic thin-film elements having bistable characteristics which are arranged in addressable registers. Each of the registers of the control memory is randomly accessed in accordance with the address as contained in the $S_0$ register. As with the core memory, reading-out of information stored in the control memory is destructive and, therefore, a memory reference cycle includes both a read-out portion and a restore or write portion. Again, similar to memory section 1, a control signal required to be sent to the Control Memory Section is an Initiate Memory 0 signal which results in a complete memory reference cycle including both the read and the restore or write portions thereof. When it is necessary to write or store new information in the control memory, the coded permutations of the address location are placed in the $S_0$ register and the initiate memory 0 control signal is applied to said memory section. The normal transmission of the data stored in the addressed register to the $Z_0$ register in a parallel mode is inhibited while the new information to be stored is transmitted from some external register to the $Z_0$ register. Since the read-out of the stored information is destructive, all of the stages of the addressed register of the control memory are cleared or are in the "0" state as a result of the read operation and during the write or restore operation, the new information in the $Z_0$ register is written into the previously addressed control memory register. Due to the fast switching speeds of the thin-film elements used as the storage elements in the control memory as compared to the core storage elements in the memory section 1, the time duration of the control memory reference cycle is considerably less than the time duration of the memory reference cycle for memory section 1. In the embodiment here described the control memory reference cycle time duration is ⅙ of that of the memory section 1 reference cycle. In copending application by Rubens et al. on Magnetic Apparatus and Methods, Serial No. 626,945, filed in December 1956, now Patent No. 3,030,612, and assigned to the same assignee as the instant invention there is described in greater detail an embodiment of a thin-film memory device comprising a 4×4 array of individual magnetic thin-film elements utilizable for storing binary information. The device described therein, in particular in relation to FIG. 11 in said application, utilizes the well known coincident-current technique for selecting an individual element from the array of elements for the storing or the reading of the contents thereof. In an article entitled "Matrix Memories—Comparative Evaluation," by Richard J. Petschauer and Kevin Leenay, in the August 30, 1961, issue of Electronic Design, pages 42–55, there is described in greater detail a random-access thin-film memory of the word-organized type which is a preferred embodiment of the control memory utilized in the instant invention. Selection circuitry including the translation of the coded address contained in the S register as well as driving and sensing circuitry for applying the proper magnitude of magnetic fields as required and for sensing the magnetic state of the element in accordance with its stored binary representation and for setting the magnetic state in accordance with the binary value to be stored, are all well known in the art and are considered in this application to be internal to the workings of the memory section itself. The memory control circuitry required to operate the memory sections in response to the memory initiate signals section are, of course, a matter of choice and design.

The computing device described in this specification is basically a synchronous device. As used in the specification and the claims, synchronize, and words derived therefrom, means generally in time relationship. For example, the statement to the effect that a plurality of control signals are synchronized does not mean that they all occur at the same instant of time, which would be true under the common dictionary definition of the word synchronize, but does mean that the control signals do have a definite time relationship with respect to one another. A more specific example in conjunction with the memory sections described briefly above would be that the memory initiate control signal into the memory section is synchronized with the P to $S_1$ control signal so that the memory reference cycle is initiated at a certain time relative to the transmission of the data from the P register to the $S_1$ register. Obviously, this type of synchronization is required so that the memory reference cycle is not initiated prior to the storage address register receiving a coded address of the storage register to be accessed.

Although the device is basically synchronous, some asynchronous transmission of signals does occur wherein a signal may propagate or ripple through a series of logic elements and the time required to propagate through being primarily dependent upon the amount of delay in each of the logical elements. However, in all instances the signals are eventually, at some juncture of their propagation path, synchronized. The synchronization is controlled by a four-phase clocking system, the wave shapes of which are shown in FIG. 2. Each of the phase signals, A–D, is appropriately and respectively labeled phase 1–phase 4 and all are of equal pulse repetition rates and of equal pulse time width. During one complete clocking cycle, one pulse of each of the four phases occurs and this continues repetitively as long as the clock signals are generated. Any well known means may be utilized to generate the clocking signals shown and to distribute them throughout the computing device for use. During the period of time at which each of the clock phase signals is at a negative pulse level it can be considered to be outputting a binary 0 and at all other times to be outputting a signal level equivalent to a binary 1. As shown in FIG. 2 for exemplary purposes, each clock pulse is of ⅙ microsecond time duration and one complete clock cycle is ⅔ of a microsecond in time.

Referring again to FIG. 1, the primary transmission paths between the Arithmetic Section 10 and other registers of the computer along with the appropriately labeled control signals for each of said transmission paths are shown. However, for clarity the various control signals which control the operation of the Arithmetic Section are not shown in the figure since they are not considered essential to the explanation of the invention. Where necessary to describe the sequence of events in a normal instruction-controlled computer operation, the development of control signals for the Arithmetic Section will be described briefly. However, these will be referred to as arithmetic initiation signals in response to which the Arithmetic Section will effect the proper arithmetic operation and as required will transmit the results to other portions of the computer under the proper transmission control signals. Additionally, although it is recognized that the input-output section 12 does require control signals, the development of these likewise is not considered essential to the description of the instant invention and therefore will only be briefly mentioned as required. The only signal of importance to the instant description is the interrupt signal appearing on the interrupt line 44 in FIG. 1 and its relevancy will be subsequently pointed out.

To summarize briefly to this point, there has been described the essential parts of a computing device including a Control Memory Section having a memory reference cycle of ⅔ microsecond; a comparatively slower speed Core Memory Section having a memory reference cycle of four microseconds; data transfer and storage address registers for each of said memory sections a function register for temporarily storing the coded permutations of an instruction word which controls the functional operation of the computer; a second level register for further storing a portion of the instruction word originally contained in the function register; an Index Adder for selectively modifying information; a program address register; a plurality of additional registers for use primarily in conjunction with the Index Adder; the transmission paths available among the various registers and sections; and the control signals required to control the transmission of information over said transmission paths.

In order to most clearly describe the instant invention an exemplary repeatable function as represented by a coded instruction word will be utilized. There will first be described the various control signals developed by the Control Section in order to effect the repeated instruction with said control signals being shown in their proper time relationships. Included in the control signals will be those required in order to initially set up a repeat mode of operation, those required to repetitively perform the function as represented by the operation code of the instruction word, and those required for testing for the conditions upon which the repeated mode of operation should terminate, all of which are developed in response to the coded permutations of a single instruction word. Additionally there are included those signals required for temporarily discontinuing the repeat function in response to an interrupt signal and for seting up conditions so that when the repeat function is reinitiated it can continue from the same juncture at which it was temporarily halted. Lastly, there will be described the means for developing the control signals and the means for gating the transmission paths in response to said control signals. An exemplary coded instruction word for controlling a repeat function to be utilized in the following description is shown immediately below with octal representations of each of the respective designators of the instruction word.

| *f* | *j* | *a* | *b* | *h* | *i* | *u* |
|---|---|---|---|---|---|---|
| 62 | 00 | 17 | 14 | 1 | 0 | 000255 |

Although for ease in explanation the instruction word is shown in octal code representation, it is not true that in all cases each octal digit represents three binary digits or bits. For example, the *j* designator coded representation is restricted to four bits although the octal representation is shown as 00 so the binary equivalent would be 0000, the *a* designator of octal 17 is equal to binary 1111, the *b* designator of octal 14 is equal to binary 1100. The computer operation to be performed in response to this exemplary instruction word is called a Repeated Equality Test and briefly the function is that if the contents of the control memory address designated by the *a* designator is equal to the contents of the memory section 1 addressable register designated by *u*, with *u* being modified by the contents of the control memory register as designated by *b*, the next instruction should be skipped. If there is not equality, continue the repeated test and when the repeat count becomes zero do the next sequential instruction of the program. In greater detail then, the *f* portion of the instruction word which is equal to octal 62 is the operation code and the coded representation designates that a word at a first location should be compared to a word at a second location and that this function should be continuously repeated. The *j* designator in this particular instruction designates the portion of the two words which should be compared and in this instance with *j* equal to octal 00, it designates that the whole of the two words should be compared. The octal representation 17 of the *a* designator represents a specific address in the Memory Section 0, at which one of the words to be compared, hereinafter referred to as the comparator, is located. The *b* designator equal to octal 14 also represents an address in Memory Section 0 which address location contains a word which is utilized to modify the *u* portion of the instruction word. The word located at the address designated by the *b* designator is referred to as the address-modifier and, as will be subsequently described in greater detail, has the capabilities of self-modification in addition to being utilized for modifying the base address. The *h* designator equal to one designates the manner in which the address-modifier word will be self-modified. Briefly, it can be stated that the self-modification of the address-modifier word is effected by adding to the upper half of the address-modifier word the lower half of said word. The *h* designator controls the self-modification, i.e. if $h=1$ self-modification is effected but if $h=0$, no self-modification is allowed. In this exemplary case, $h$ being equal to 1, designates self-modification. It should be noted that the modifier portion can be negative to result in subtractive modification. The $i$ designator equal to 0 is not pertinent to the instant invention and will not be described in any detail. Finally, the $u$ portion of the instruction word contains the coded representation of a base address, usually located in Memory Section 1, of the second of the two words which are to be compared hereinafter referred to as the operand.

The functional steps in proper sequential order necessary in order to fulfill the requirements of the repeated equality test instruction along with any explanatory comments required for each of said functional steps will now be listed. It should be assumed, of course, that address locations in the memory sections contain previously stored information, this information having been originally stored either when the set of program instructions was first placed in the memory sections or during the course of earlier programmed operations. Further, it should be assumed that this particular instruction is one of a series of instructions comprising the program and that it has been called out of the Memory Section in the normal course of program operation. In view of this latter assumption, obviously then, the contents of the P register, which is a program address register, contains the coded representation of the address of the next sequential instruction which is to be performed in the course of the program operation after the present repeat instruction is terminated and that the instruction word described above is presently contained in the $F_0$ register, 28. The sequential functional steps required in response to the instruction word can be broken up into two groups with the first group comprising those functional steps required as a repeat set-up operation and a second group comprising the functional steps to repetitively perform the specific function as well as those steps required to determine if the conditions for termination of the repeating function have been met. These sequential functional steps are:

Group I (Repeat Set-Up):

A. Translate the operation code of the instruction word as contained in the $f$ portion thereof. This, of course, is continuously done through the entire period during which this particular instruction is effective.

B. Store away the address of the next sequential instruction of the program. This is required so that when the present instruction is terminated the address location of the next sequential instruction of the program is available for reinitiation of the succeeding program instructions. Since the P register normally contains the address of the next sequential instruction, in order to insure that this particular address is not lost due to use of the P register during the operation of the instruction presently being performed, this information is stored away in a specific location in the Control Memory Section.

C. Obtain the information which determines the number of times the present functional operation should be repeated, i.e., the repeat count. This information is previously stored in a specific location in the Control Memory. During the repeat function operation the repeat count is held in the P register and is reduced by one for each repeated function. During each repeated function the repeat count is tested to determine if the repeated operation should be terminated by the count being reduced to zero.

D. The comparator word is placed in the Arithmetic Section. This word is also obtained from a specified address in the Control Memory, said address being designated by the coded permutations of the $a$ designator of the instruction word.

Group II (Repeated Function):

A. Place the operand in the Arithmetic Section and initiate the arithmetic operation to do the comparison. Although it is possible that the operand is located in the Control Memory, in general it is preferable to have said operand located in the Core Memory. The address in the Core Memory at which this operand is located is determined by the base address, which is designated by the code permutations in the $u$ portion of the instruction word, as modified by the address-modifier word which is located in the Control Memory at the address as designated by the coded permutations of the $b$ designator. At this juncture it is felt that further explanation would be beneficial. Obviously in a repeated equality test, by repetitively comparing words to a single comparator word for equality, each of the operands which is successively compared to the comparator should be different since repetitive comparison of the same two words would be meaningless. Therefore, it is necessary to obtain the operands from different storage locations so that the same operand is not always compared. To do this the base address is always modified prior to the memory reference cycle by the address-modifier word and, in turn, the address-modifier word itself is self-modified.

B. Modify the address-modifier word. This is the functional step required to effect the operation described immediately above in A. An example might serve to further clarify the necessity for the modification steps required in A and B. The address-modifier word is previously stored in a specified location, designated by the $b$ designator, in the Control Memory Section and consists of an upper half and a lower half with each half independent of the other. Assuming in a given instruction word the base address is 255 and that the lower half of the address modifier word is 0 and that the upper half of the address-modifier word is equal to 1. To obtain the first operand, the lower half of the address-modifier word is added to the base address so that a storage location as represented by the coded permutation of the $u$ portion of the instruction word, equal to 255, is the address in Memory Section 1 from which the operand will be obtained. The upper half of the address-modifier word is added to the lower half of said word and the result is restored in the same address location from which it was obtained, said address location being designated by the coded permutation of the $b$ designator in the instruction word. The address-modifier word will now have an upper half still equal to 1 but the lower half will now also be equal to 1. Upon repeat of the function, the base address 255 is again modified by the lower half of the address-modifier word so that the next operand is obtained from memory location 256 and the self-modification of the address-modifier word results in the new value of the address-modifier word being equal to an upper-half of 1 and a lower-half equal to 2. It can be seen then that address modification along with the self-modification of the address-modifier word provides the means for accessing different storage locations so that new operands can be obtained for successive repeated operations.

C. Subtract 1 from the repeat count and test for repeat count equal to 0. This step is self-explanatory.

D. If the repeat count does not equal 0, repeat steps A through C under Group II above.

It is understood, of course, that the above listed steps state broadly the functional operations in their proper sequential relationships. An electronic computer, of course, can only respond to electrical signals so in order to implement the above listed functions there must be developed control signals comprising a plurality of properly sequenced individual command signals in the form of electrical signals to which the computing device can respond. The table shown in FIGS. 8*a* through *e* lists these individual command or control signals which are required in order to effect the repeated operation in response to the exemplary instruction word used herein. The table includes four main columns which are respectively labeled reading left to right: Time Slot, $T_0$ Sequence, $T_2$ Sequence, and $T_3$ Sequence. Contained in the Time Slot column is an additional subcolumn titled "Clock Phase." The Time Slot numbers place in proper sequential order the control signals listed in the table. Each of said time slots covers the time period included in one complete clock cycle which includes clock phases 1 through 4. It should be recalled that in this embodiment each of the clock pulses is of ⅙ of a microsecond time duration and a complete clock cycle requires ⅔ of a microsecond to accommodate four clock phases. Therefore, each of the time slots occupies a period of time equal to ⅔ of a microsecond. Further it should be recalled that a memory 1 reference cycle requires four microseconds which means that at least six time slots are occupied by said memory reference cycle and that the memory 0 section reference cycle requires ⅔ of a microsecond so therefore a reference to the Control Memory can be effected in each of said time slots. It should be noted that starting from the top and reading down the time slots are numbered 4, 5, 6, 1, 2, 3, – –. The reason for the initial time slot being labeled 4 is that it has been found in the design of the computing device that the time slots 4, 5, 6, 1, 2, 3 in that order should be allocated to the memory reference cycle for Memory Section 1 with the initiation of the memory reference cycle occurring in time slot 4. This will become clear in the course of the description of the remainder of the table of FIG. 8. Two additional features of the table of FIG. 8 should be mentioned at this time. The first is that the clock phase time within a given time slot that a control signal is listed at is relatively unimportant as regards the sequence of operation and occurrence of the control signals. Of primary importance for proper sequential operation is the time slot within which the particular command signal occurs. Hereinafter when listing the time at which a particular control signal occurs it will be referred to by a two-digit number with the two digits separated by a period (.) with the lefthand digit indicating the time slot and the righthand digit indicating the clock phase within that time slot. The other feature of the table, and the control signals listed therein, is that the table is intended to show the times at which the control signals are developed, not the times at which the functions which are controlled by said control signals occur. Even though a control signal is shown in the table to be developed at time 4.1 the particular function that it controls may not occur, because of further delays, until time slot 5.1. However, the relative time relationships of the occurrence of the particularly controlled functions will still be maintained even though the actual times may be different than those listed in those tables. That is, if a particular control signal is developed at time 4.1 but the particular function that it controls does not occur until time 5.1, the particular function that occurs under the control of a control signal that occurs at 5.1 will not occur until time subsequent to the other control function. One further point concerning the table of FIG. 8 should be clarified. It should be assumed that the particular exemplary instruction utilized herein to describe the instant invention is an instruction that occurs sequentially in the course of a computer program. Therefore, during the interval of time during which the particular exemplary instruction is called up out of the memory section a prior instruction, which is also part of the program, is still being executed. Therefore, some of the control signals listed in the table refer to control signals that are developed in response to the prior instruction word. These latter control signals are distinguished from the control signals developed from the particular exemplary instruction word by an asterisk immediately adjacent the control signal label. They are only included as representative of control signals from a prior instruction and their inclusion serves to illustrate the capabilities of the computing device to incorporate a type of instruction overlap operation. It should be assumed then that at the time slot 4 a prior instruction word is contained in the $F_0$ register 28 of FIG. 1 and the *f, j* and *a* portions of said prior instruction word are contained in the $F_1$ register, 30, of FIG. 1.

All of the required control signals are listed in the table in the three columns reading from left to right labeled respectively $T_0$ Sequence, $T_2$ Sequence and $T_3$ Sequence. The $T_0$ Sequence can be considered the Primary Control Sequence. It is used most extensively to develop the control signals which are common to virtually all of the instructions of the computer. The $T_2$ Sequence develops control signals for repeat type instructions and is referred to as the Repeat Set-Up (RSU) Sequence. It provides control signals required to initially set up the operation of the repeat instruction as well as the control signals required when the repeat instructions are temporarily terminated. The $T_3$ Sequence, referred to as the P Sequence, provides the control signals which are primarily utilized to affect the contents of the P register either to increment the contents during the normal program operations so that P will always contain the address of the next sequential instruction in the program or to modify the repeat count which is contained in the P register during the course of the repeat instruction. The control signals listed in the table can be categorized as main command signals and subcommand signals with the former being those signals which actually control the steps required to effect the repeated operation and the latter being the signals required in the course of obtaining the main command signals. The main command signals are primarily the signals which control the transmission paths which were described in conjunction with FIG. 1 and are distinguished from the subcommand signals by being underlined in the table. A further group of signals, referred to as the conditioning signals, are not shown in the table but are included in the figures which describe the means for developing the command and subcommand signals.

The logical arrangement of the circuitry for development of the control signals in the $T_0$ Sequence is shown in FIGS. 9*a*–*d*, while the circuits for the $T_2$ and $T_3$ Sequences are shown respectively in FIGS. 10*a*–*c* and 11*a* and *b*. To most clearly describe the operation of the instant invention, the means for developing each of the control signals listed in the table will be explained in the same sequential order as the signals are listed. This requires continual cross-referencing between the circuit diagrams of FIGS. 9, 10, 11 and the table of FIG. 8. To further aid in understanding the operation of the circuits a few features are now pointed out. In FIGS. 9, 10 and 11 time increases from left to right, that is, in relating time in those figures to the time slots listed in the table, the lowest number time slot can be considered to be at the leftmost portion of the figures and as the signal continues towards the right it advances in time slot designation. Except for the initiation signal for each of the sequences, the inputs appearing at the bottom of the figures are the conditioning signal input lines while those outputs emanating from the top of the figures in a vertical direction can be considered the control signal lines which carry the command and subcommand signals which are developed by the respective sequences. In some instances the subcommand signals developed in a sequence affect conditioning signals for the same sequence or for one of the other sequences or both, but for the most part the developed control signals are those which are directly utilized to control the transmission paths described in FIG. 1.

In general, the control signals developed in each of the sequences are of a "1" signal level to activate the corresponding control signal line whereas the conditioning signals into each of the sequences are generally active when of the "0" signal level. Where the condition is otherwise, it will be pointed out in the course of the description.

Before starting through the table it should be recalled that there is an assumption that there is a prior instruction stored in the $F_0$ and $F_1$ registers at the first time slot, 4.1, shown in the table and those control signals relating to said prior instruction are distinguished in the table by an asterisk.

Referring now to the table of FIG. 8*a* starting with time slot 4.1 the first required control signals are main command signals P to $S_1$ and Initiate Memory 1 while the required subcommand signals are Set P Designator Flip-Flop, and Set $Z_1$ to $F_0$ Flip-Flop. These are the control signals which are related to the obtaining of the Repeated Equality Test instruction word from the Core Mercury Section and placing it in the $F_0$ register. There are further shown in time slot 4.1 control signals for the prior instruction stored in the $F_1$ and $F_0$ registers and are the $F_{1A}$ to $S_0$ and Initiate Memory 0, as well as the $Z_0$ to X control signal at time slot 4.2. Referring now to the $T_0$ Sequence circuit starting with FIG. 9*c*, assume that the T041 Flip-Flop 60 is in the "1" or set state, with all other flip-flops in the various figures in the "0" or cleared state, so that the zero side outputs a "1" which is transmitted to the T0941 NOR circuit which inverts the signal and develops a "0" output therefrom into the H0441 NOR circuit. The other signal input to H0441 is a conditioning signal of Repeat Flip-Flop=0, that is, that no repeat function is presently being performed. With both of the inputs to H0441 being "0's" the output therefrom is a "1" to activate control signal lines respectively labeled P to $S_1$, Initiate Memory 1, Set P Designator Flip-Fop and Set $Z_1$ to $F_0$ Flip-Flop. As a result of these control signals developed in time slot 4, the contents of the P register are transmitted to the $S_1$ register and a Core Memory reference cycle is initiated so that information stored at the location as designated by the coded permutations in the $S_1$ register will be read-out of the Core Memory Section into the $S_1$ register. Further the P Designator Flip-Flop and the $Z_1$ to $F_0$ Flip-Flop are set. These in turn provide conditioning signals respectively for the $T_3$ Sequence and the $T_0$ Sequence and their functions will be described in relation thereto. Another output from the 0 side of the T041 flip-flop is transmitted to T0842 and in turn provides a first "0" input to H0541. The conditioning signal applied to H0541 is Read Operand If Required which is dependent on the coded permutations of $f_0$ being equal to 6–. In this instance we can assume that the prior instruction in the $F_0$ register is one which does not have an operational code, *f*, equal to 6– and therefore the conditioning input into H0541 is a "1" so that the output therefrom is a "0" so that the control signal line coupled thereto is inactive. From the output side of the T045 flip-flop, 60, a "0" signal is transmitted to T0841 and this is combined with another input to T0841 labeled clock phase 1. At the time that phase 1 is effective, as can be seen from FIG. 2 as occurring at the time that a negative going pulse is present, T0841 outputs a "1" which is transmitted to the 1 input side of the T043 flip-flop, 62, to set it. This results in a "0" signal output from the 1 output side of the T043 flip-flop which is combined with the phase 2 clock signal at the input to T0243. The resulting "1" output from T0243 occurring at clock phase time 2 is fed back to the 0 input side of the T041 flip-flop clearing it to the "0" state. A further output from T0243 is transmitted into the 1 input side of the T051 flip-flop 64, setting it. Concurrently the "1" output from the 0 output side of the T043 flip-flop activates the control signal line labeled $Z_0$ to X, while another output from the 0 output side of the T043 provides a "0" input to H0243 in passing through T0943. The conditioning signals applied as additional inputs to H0243, namely Interrupt Request Flip-Flop=1 and Repeat Flip-Flop=1, are ineffective and therefore the output from H0243 will be a "0" so that the control signal line coupled thereto is inactive. The other control signals required during time slot 4 are developed from an additional output from the 0 side of the T041 flip-flop, 60, which is coupled to T0741 to develop a "0" output therefrom and combined with the conditioning signal of Reference to A If Required ($f_1$=3–) at the input to H0742 to develop a "1" output on the control signal lines labeled $F_{1A}$ to $S_0$ and Initiate Memory 0. We can assume for descriptive purposes only that the prior instruction presently contained in the $F_0$ and $F_1$ registers is one in which the coded permutations of the operation code, $f_1$, is equal to 3– so that the conditioning signal applied to H0742 is active. Therefore, it can be seen that during time slot 4 while a prior instruction exists in the $F_0$ and $F_1$ registers, a new instruction is read-out of the Core Memory Section while concurrently, in response to the prior instruction, information is read-out of the Control Memory Section and transmitted to the X register in the Arithmetic Section. This serves to exemplify the type of computer operation previously referred to as instruction overlap operation. It should be recalled at this point that even though the Memory 1 Section is initiated at time slot 4 that six time slots are required to complete the memory reference cycle, while a reference to the Memory 0 Section is completed during one time slot.

Continuing now with the $T_0$ Sequence at time slot 5, the control signals required which relates to the previous instruction still in the $F_0$ and $F_1$ registers are $F_{0b}$ to $S_0$ and Initiate Memory 0 at time slot 5.1, and Index Adder (IA) to $Z_{0L}$ at 5.2. A first output from the 1 side of the T051 flip-flop, 64 provides a first input to H0251 which has a conditioning input signal of Repeat Terminate Flip-Flop=0 and since the latter condition is in effect the two "0" inputs to H0251 will result in a "1" output therefrom so that the output lines labeled $F_{0B}$ to $S_0$ and Initiate Memory 0 will be active. A second output from the 1 side of the T051 flip-flop is combined with the clock phase 4 input to T0251 to provide a "1" output therefrom at said clock phase time which serves the dual purpose of clearing the T043 flip-flop, 62 and setting the T053 flip-flop, 66. The "0" signal output from the 1 side of the T053 flip-flop which provides an input to T0853 results in a "1" output from T0853 activating the control signal line labeled IA to $Z_{0L}$. In this manner another control memory reference cycle is undergone in response to the prior instruction to store the contents of the Index Adder into the Control Memory Section. Concurrent with the "0" signal output from the 1 side of the T051 flip-flop, the 0 side outputs a "1" which is inverted to a "0" by T0751 and applied as a first input to T0351. This first input is combined with a clock phase 1 signal and conditioning signals of Enable P and Repeat Terminate Flip-Flop=0 to activate the Initiate $T_3$ Sequence control signal line at time slot 5.1.

From the table it can be seen that control signals are developed by the $T_3$ Sequence concurrently with the development of further control signals in the continuation of the $T_0$ Sequence. The output from T0351 in the $T_0$ Sequence provides a first OR input to the T353 flip-flop, in the $T_3$ Sequence shown in FIG. 11*a* to set said flip-flop. The "1" signal output from the 0 side of the T353 flip-flop activates the Clear $W_1$, $W_2$ and $W_3$ control signal line at 5.3. The "0" signal from the 1 output side of the T353 flip-flop activates the P to $W_1$ control signal line. The latter control signal line is activated when in the "0" signal state as distinguished from those which are activated when in the "1" signal state. The reason for this will be subsequently shown. Concurrently another "0" signal output from the 1 side of the T353 flip-flop provides a first input to H3254 and a second input signal thereto is the conditioning signal of P designator Flip-Flop=0. Since at time slot 4.1 in the $T_0$ Sequence the P Designator Flip-Flop was set, the conditioning signal input to H3254 is a "1" so that the output therefrom is a "0" which is a first input to T3254. This combines with a second signal input to T3254 from the 1 output side of the T353 flip-flop along with the clock phase 4 signal to activate the +1 to $W_3$ control signal line at time slot 5.4. At clock phase 3 an output from the 1 side of the T353 flip-flop results in a "1" signal level output from T3253 which sets the T361 flip-flop 70 so that the "1" signal level from the 0 output side of the T361 flip-flop activates the Clear P control signal line at time slot 6.2. With the T361 flip-flop set, the combination of the "0" signal level from the 1 output side of said flip-flop and the phase 1 clock pulse results in a signal being fed back from T3261 to the 0 input side of the T353 flip-flop to clear it and also a signal being sent to the 1 input side of the T363 flip-flop, 72 to set it. In general, as a signal propagates sequentially through the flip-flops in the respective sequence circuits, a signal is fed back to clear a previously set flip-flop. In some instances other means of clearing the flip-flops in the sequence circuits are utilized. In any event it should be recognized that once the required control signals are developed in response to a sequence flip-flop being set, said flip-flop is subsequently cleared to be ready for another pass through the sequence. With this in mind, no further mention will be made of the clearing of the flip-flops in the sequence circuits as the signal propagates through the circuit. Continuing through the $T_3$ Sequence, it can be seen that at clock phase 3 the T371 flip-flop, 74 is set which in turn will result in activation of the control signal lines respectively labeled Clear R and IA to R and through the next sequential flip-flop T373, itemized at 74, which in turn will activate the R to P control signal line at time slot 1.3 as well as developing a Clear P Designator Flip-Flop control signal from the output of H3374 at time slot 1.4. The Set Repeat Terminate Flip-Flop control signal line is not activated since at least one of the conditioning signal inputs to H3274 is not active resulting in a "0" output from H3274. In review then of the control signal developed in the $T_3$ Sequence it can be seen that the contents of the P register are incremented by setting the $W_3$ register to +1, transmitting the contents of the P register to $W_1$, summing the two unconditionally in the Index Adder, transmitting the result to the R register and transmitting said result from the R register back to the P register. The main command signals to effect said operational steps are the +1 to $W_3$, P to $W_1$, IA to R, and R to P control signals whereas the subcommand signals required in conjunction therewith are the clear $W_1$, $W_2$, and $W_3$, Clear P, Clear R and Clear P Designator Flip-Flop.

Figure 9A:
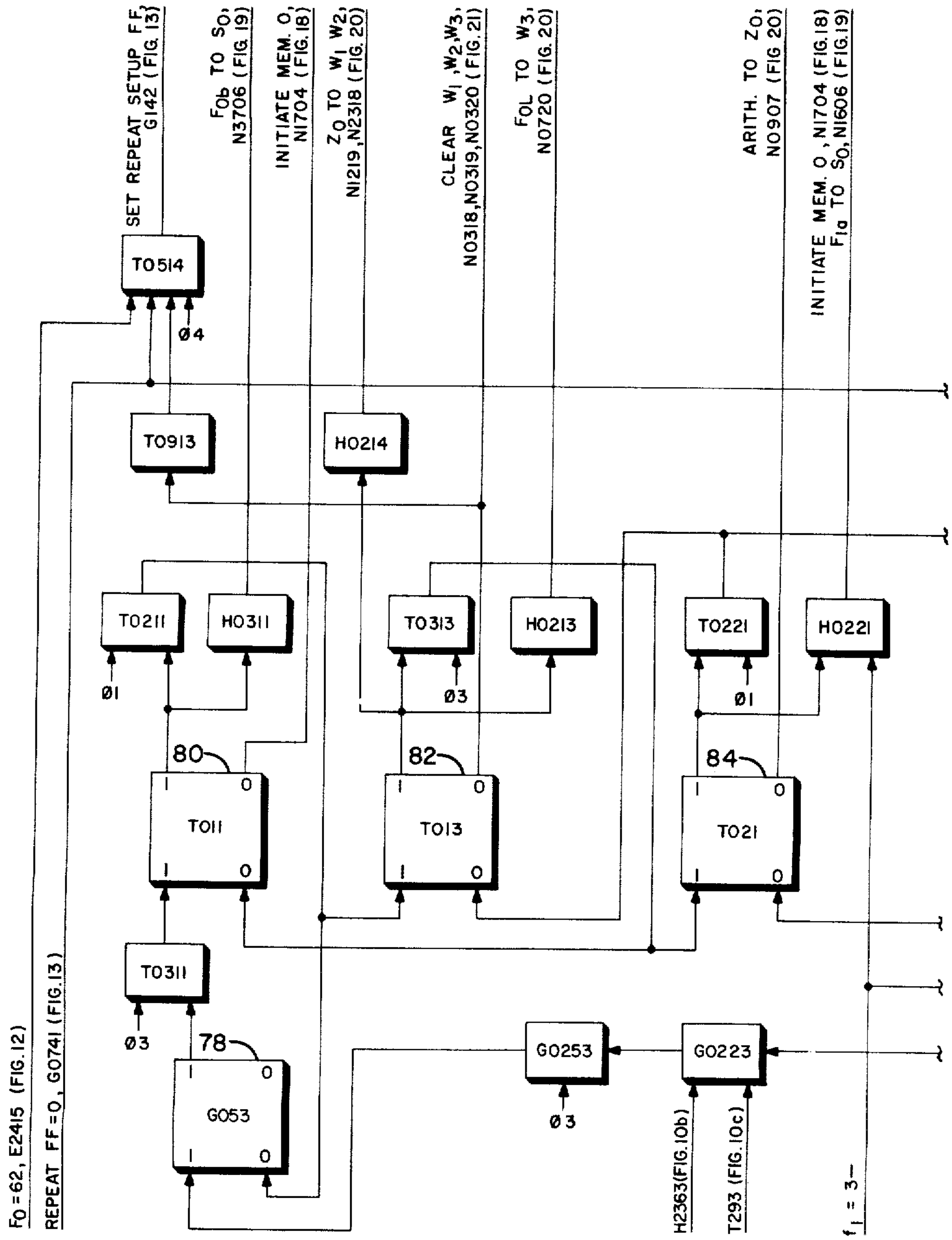
FIGS. 9–11 show control sequence circuits for developing the command and subcommand signals listed in the table of FIG. 8.
Figure 9B:
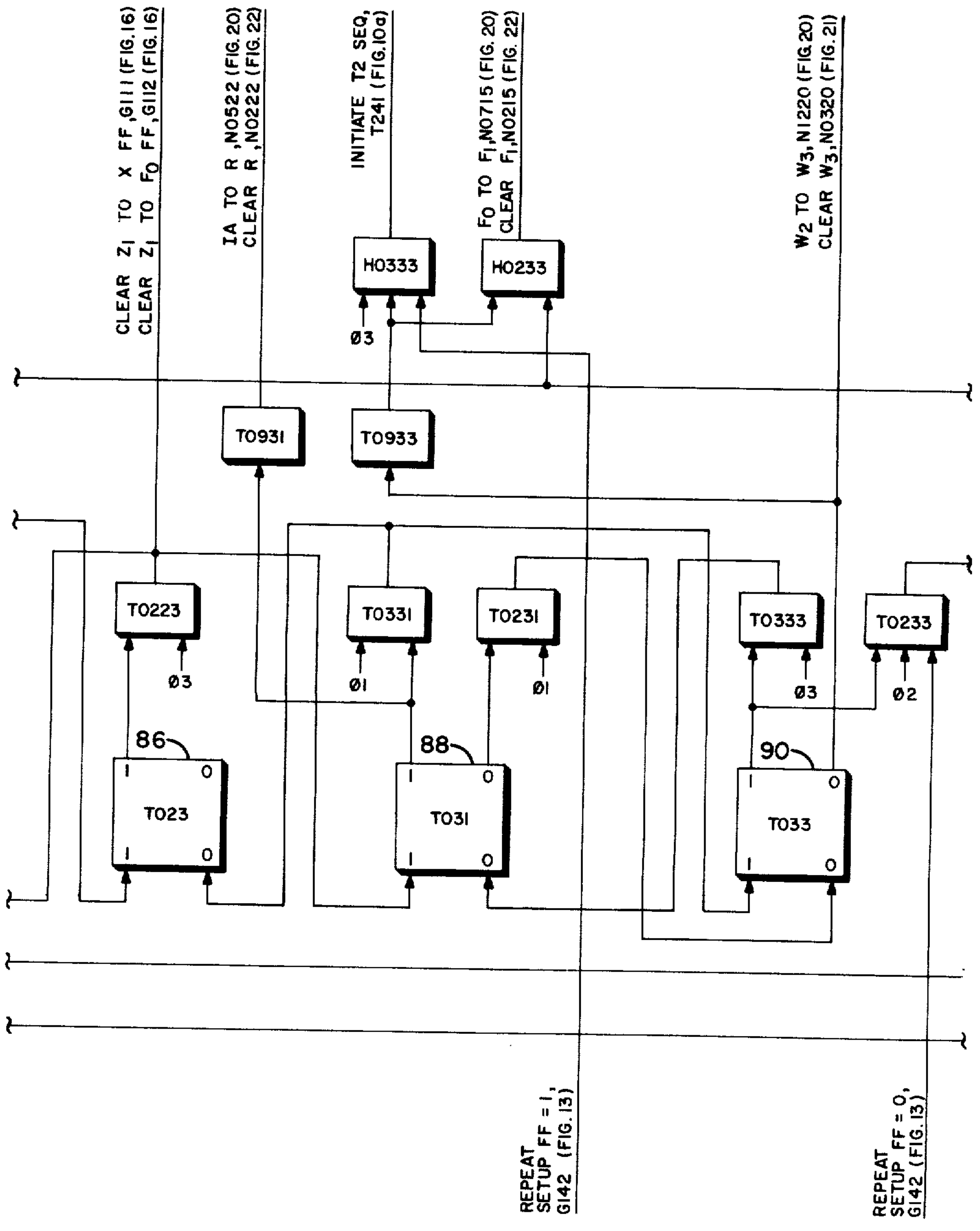
Figure 9C:
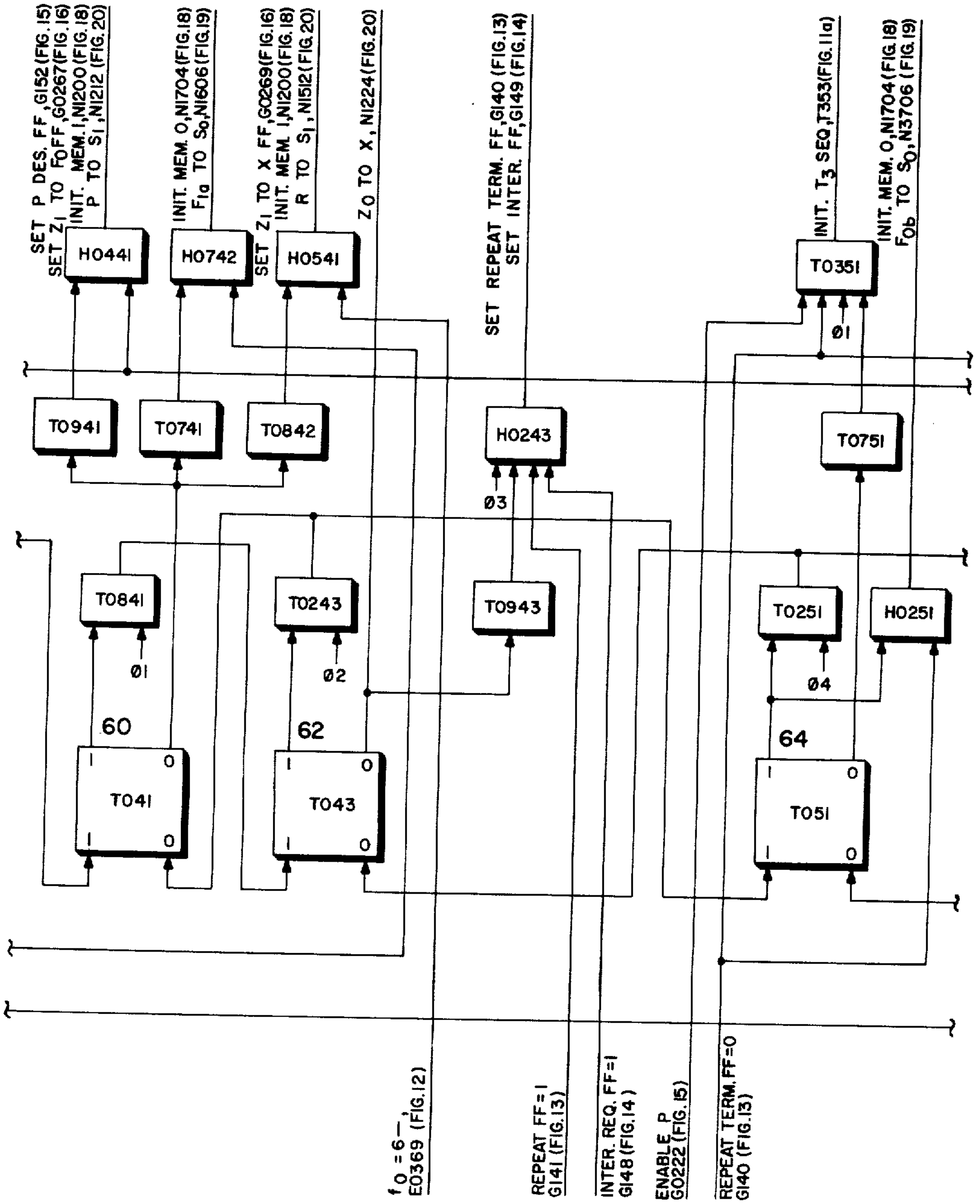
Figure 9D:
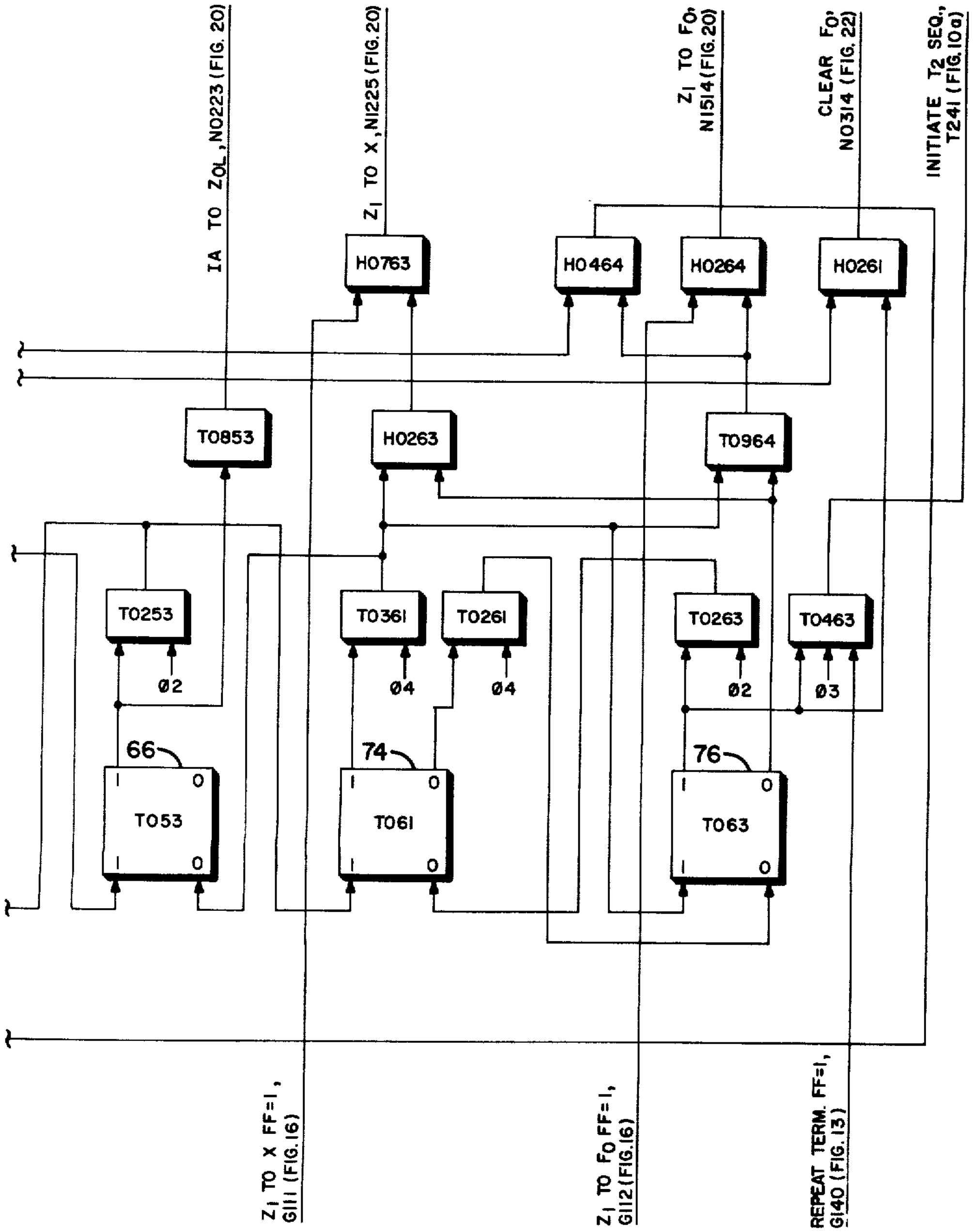

Returning now to the $T_0$ Sequence in FIG. 9*d*, as a result of the signal from the 1 output side of the T061 flip-flop, T0361 outputs a "1" signal level at clock phase 4 which in turn serves to set the T063 flip-flop, 76, and cause T0964 to output a "0." The latter combined with the conditioning signal of $Z_1$ to $F_0$ Flip-Flop=1, said latter flip-flop having been set by the subcommand signal developed in the $T_0$ Sequence at 4.1, will activate the $Z_1$ to $F_0$ control signal line via H0264. When the T063 flip-flop is set, the "0" signal output from its 1 side combined with the conditioning signal of the Repeat Flip-Flop=0 at the input to H0261 results in the Clear $F_0$ control signal line also being activated at time slot 6.2. Concurrent with development of $Z_1$ to $F_0$ control signal at time slot 6.3, the $T_0$ Sequence is reinitiated by H0464 passing a signal into the G053 FF, 78, via G0223 and G0253 in FIG. 9*a*. At the input to T0463 an output from the 1 side of the T063 flip-flop is combined with the conditioning signal Repeat Terminate Flip-Flop=1. Since the latter is not true, control signal line labeled Initiate $T_2$ is not activated. Therefore, in review, it is during time slot 6 that the new instruction word is transmitted from the Core Memory Section transfer register, $Z_1$, to the $F_0$ register to replace the prior instruction in the $F_0$ register and the new instruction is the Repeat Equality Test instruction word having the coded permutations previously described.

Figure 12:
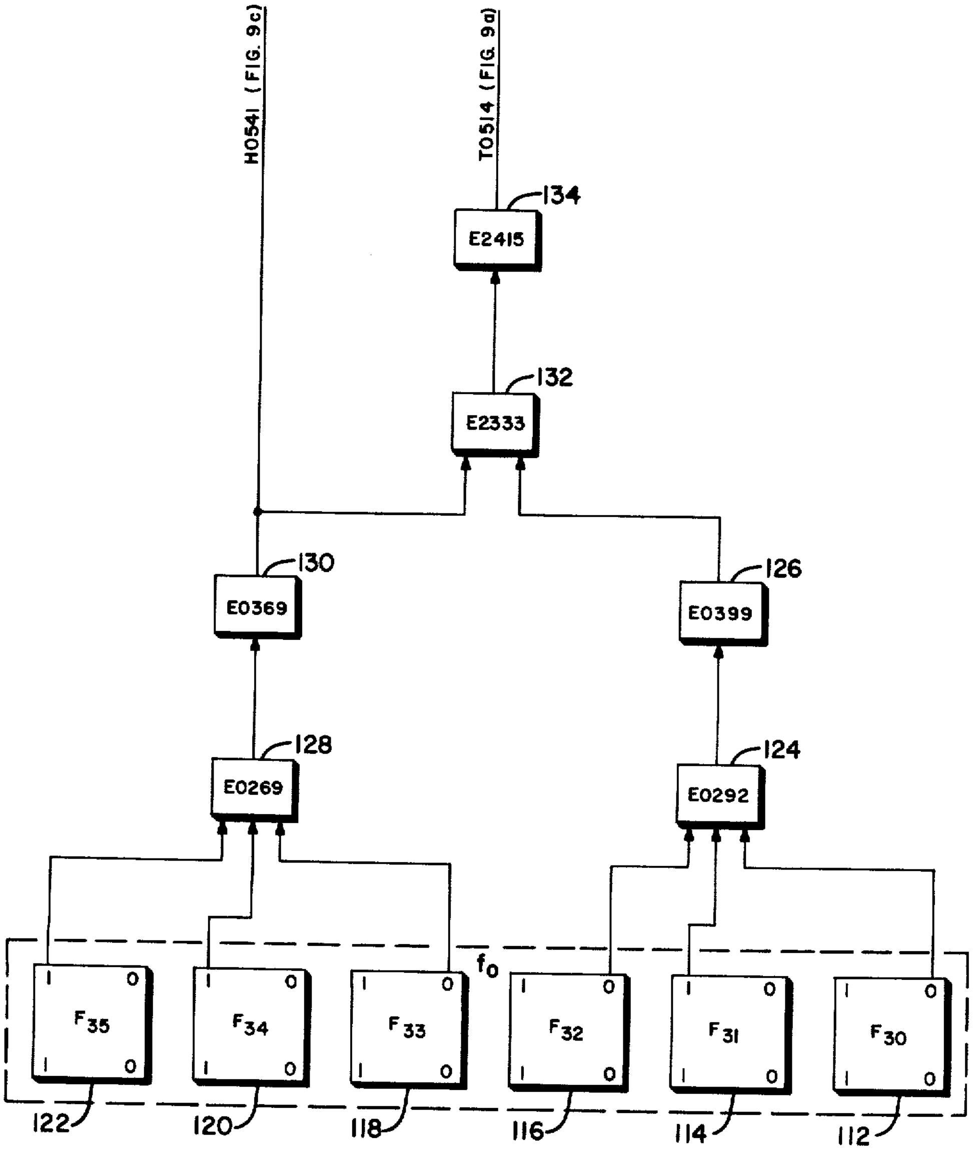
FIGS. 12–17 show circuits for developing conditioning signals which are utilized in the control sequence circuits.

With the G053 flip-flop, 78, set, T0311 will output a signal at clock phase 3 to set the T011 flip-flop 80 and the output from the 1 side of said latter flip-flop, through H0311, activates the control signal line labeled $F_{0B}$ to $S_0$. Concurrent therewith the Initiate Memory 0 control signal line is activated from the 0 output side of the T011 flip-flop at time slot 1.1. The "0" signal level from the 1 output side of the T011 flip-flop, 80, combines with the clock phase 1 signal input to T0211 to provide a "1" signal level to set the T013 flip-flop, 82, which in turn results in the activation of the control signal line labeled $F_{0L}$ to $W_3$ from H0213, the control signal line labeled $Z_0$ to $W_1$ and $W_2$ from H0214, the control signal line labeled Clear $W_1$, $W_2$ and $W_3$ from the 0 output side of the T013 flip-flop and provides a first "0" signal input to T0514 through T0913. One of the other inputs to T0514 is a conditioning signal dependent upon $f_0=62$ which is the coded permutation of the function or operation code portion of the exemplary instruction word utilized herein to describe the instant invention and which is now present in the $F_0$ register. The conditioning signal of $f_0=62$ which is applied to the input of T0514 results from the translation of the highest order six bits in the instruction word which is stored in the $F_0$ register. FIG. 12 shows the translation of these highest order six bits and will be subsequently described in greater detail. The other conditioning signal into T0514 being the Repeat Flip-Flop=0 is also active and therefore at clock phase 4 control signal line labeled Set RSU Flip-Flop is activated at time slot 1.4. As will become obvious from the further description of the continuation of the $T_0$ Sequence and the other sequences, the setting of the RSU Flip-Flop resulting from the output from T0514 and which is dependent upon the proper coded permutations in the operational code of the instruction word is the key step in the $T_0$ Sequence to control the development of the further control signals required for the repeat function. It can be seen that it is during time slot 1 that a memory reference cycle to the Control Memory Section is initiated to read-out the information which is stored at the address designated by *b* designator portion of the instruction word contained in the $F_0$ register and to place this information in the $W_1$ and $W_2$ registers while at the same time placing the *u* portion of the instruction word contained in the $F_0$ register in the $W_3$ register. All this is preparatory to modifying the base address of the instruction word, as contained in the coded permutations of the *u* portion of the instruction word, by the address-modifier which is contained in the Control Memory. At the same time the RSU Flip-Flop is set in response to the conditioning signal indicating that the coded permutation of the function code portion, $f_0$ of the instruction word in the $F_0$ register is a repeat instruction.

In time slot 2 of the $T_0$ Sequence the $F_{1a}$ to $S_0$ Initiate Memory 0 and the Arithmetic to $Z_0$ control signals are only included to show that still a further reference to the Control Memory Section can be made relative to the prior instruction during this time interval since it is still present in the $F_1$ register.

When the T031 flip-flop 88 is set by the output signal from T0223 at clock phase 3 the "0" signal level on the 1 output side therefrom applied to T0931 results in activation of the control signal lines labeled Clear R and Index Adder to R to provide said control signals at time slots 3.1 and 3.2, respectively. Additionally, there is developed by T0223 control signals of Clear $Z_1$ to $F_0$FF and Clear $Z_1$ to X FF. T0331 which also receives a signal from the 1 output side of the T031 flip-flop develops a "1" signal level output at clock phase 1 which serves to continue the $T_0$ Sequence by setting the T033 flip-flop, 90. When the T033 flip-flop, 90, is set in response to the output from T0331, the 0, side outputs a "1" on the control signal lines labeled Clear $W_3$ and $W_2$ to $W_3$. Additionally the "1" signal level output causes T0933 to develop a "0" output signal therefrom which is applied to the input of H0333 and H0233. The conditioning signal input to H0333 is RSU Flip-Flop=1 and since said flip-flop had been set at time slot 1.4 in the $T_0$ Sequence this conditional signal is effective to develop a "1" signal level output from H0333 at clock phase 3 to activate the control signal line labeled Initiate $T_2$. Since the Repeat Flip-Flop is still in the "0" state, the conditioning signal into H0233 is likewise active and it also develops a "1" signal level output signal to activate the control signal lines respectively labeled Clear $F_1$ and $F_0$ to $F_1$. It is during this time slot 3 in the $T_0$ Sequence that the result of the address-modification operation initiated in time slot 1 is transmitted to the R register from the Index Adder and the self-modification of the address-modifier word is initiated by placing the contents of the $W_2$ register in the $W_3$ register to be added to the contents of the $W_1$ register in the Index Adder. Furthermore, during time slot 3 the contents of the *f*, *j* and *a* designator portions of the $F_0$ register are transmitted to the $F_1$ register and the $T_2$ Sequence is initiated.

The "0" signal level from the 1 output side of the T033 flip-flop, 90, provides a first input to T0233. The conditioning signal input to T0233 is RSU Flip-Flop=0 and since said flip-flop had previously been set at time slot 1.4 this conditioning signal is not effective so that the output from T0233 is a "0" signal level which terminates the continuation of the $T_0$ Sequence. It should be noted that even though during the above described time slots 1, 2 and 3 of the $T_0$ Sequence the *u* portion of the instruction word is modified no memory reference is initiated to said modified address. Furthermore, even though self-modification of the address-modifier word is initiated at 3.3, the result thereof is not stored back into the Control Memory Section.

Figure 10A:
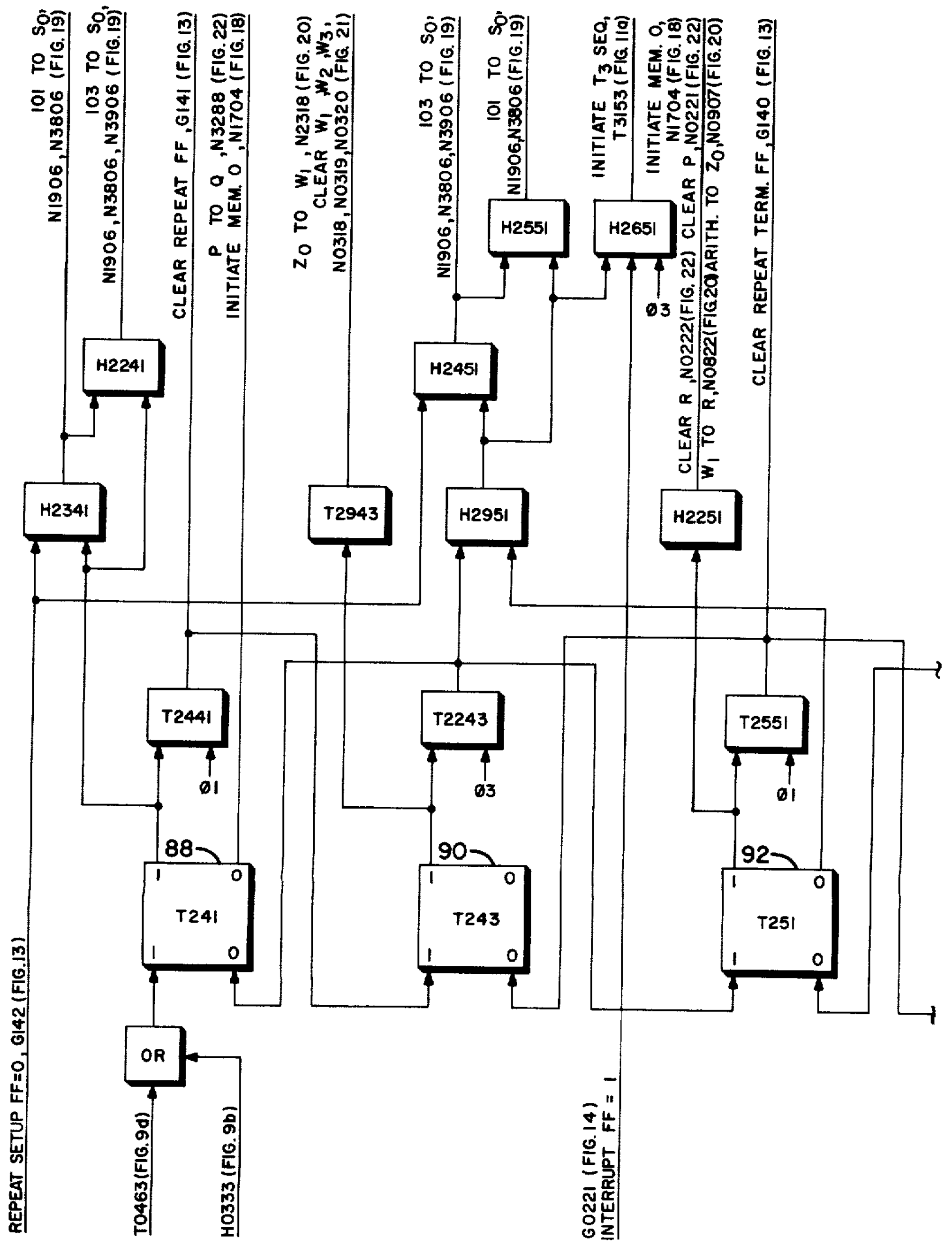
Figure 10B:
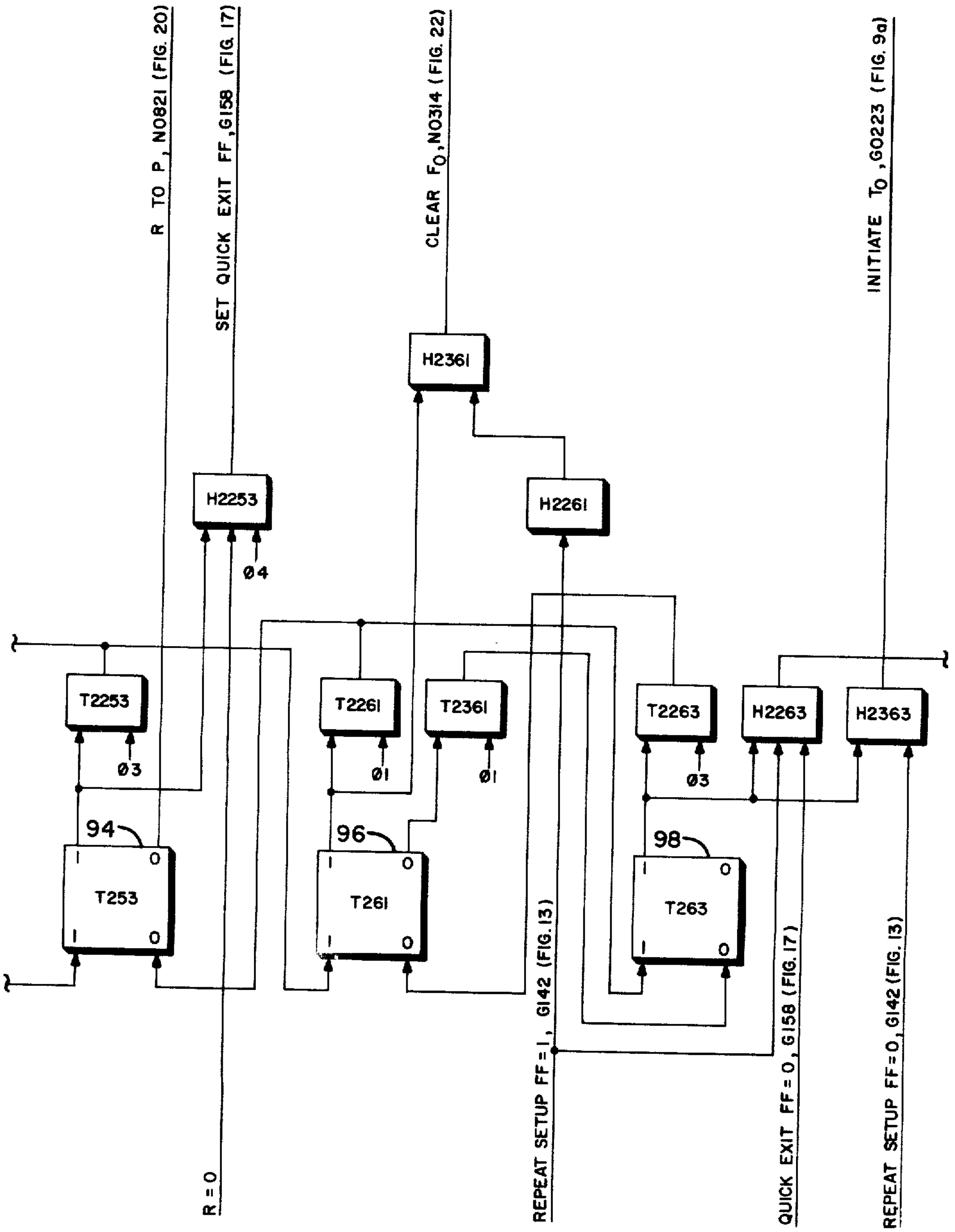

Referring now to the $T_2$ Sequence circuit in FIG. 10*a*, the signal input to the T241 flip-flop, 88, from H0333 in the $T_0$ Sequence sets the flip-flop. The 0 side of the T241 flip-flop outputs a "1" on control signal lines labeled P to Q and Initiate Memory 0 to activate said lines. The "0" output from the 1 side of the T241 flip-flop provides a first input to H2341 and a sceond input to the latter NOR circuit is the conditioning signal of RSU Flip-Flop=1. Recalling that the RSU Flip-Flop had been previously set in the $T_0$ Sequence under the condition of $f_0=62$, the two inputs to H2341 are such that it will output a "1" signal level on the control signal line labeled 101 to $S_0$. The control signal line labeled 103 to $S_0$ from H2241 is not activated because of the "1" signal level input signal to H2241 from H2341. The 1 output side of the T241 flip-flop, 88, also outputs a "0" to T2441 which has clock phase 1 input thereto so that it outputs a "1" at clock phase 1 which activates the control signal line labeled Clear Repeat Flip-Flop and additionally sets the next sequential flip-flop in the $T_2$ Sequence, the T242 flip-flop 90. It should be noted that even though the Clear Repeat Flip-Flop control signal is active from T2441 during the present propagation through the $T_2$ Sequence, this control signal does not provide any useful purpose since the Repeat Flip-Flop has not previously been set. Continuing through the $T_2$ Sequence, it can be seen that via T2943 which receives an output from the 1 side of the T243 flip-flop, the control signal lines labeled $Z_0$ to $W_1$ and Clear $W_1$, $W_2$ and $W_3$ are activated and further, that T2243 outputs a "1" to set the T251 flip-flop 92. The output from T2243 further provides a "1" signal level input to H2951. A second input to H2951 is from the 0 side of the T251 flip-flop so as a result of either of the inputs H2951 outputs a "0" signal level which provides a first input to H2451. The second input to H2451 is a conditioning signal which is equal to the condition that the RSU Flip-Flop=1 which conditioning signal is active so that H2451 will output a "1" signal level on the control signal line labeled 103 to $S_0$. The output from H2451 is also transmitted as an input to H2551 and being of the "1" signal level state causes H2551 to output a "0" on the control signal line labeled 101 to $S_0$ thereby making it inactive. The logical arrangement being similar to the like labelled control signals which are developed from the T241 flip-flop is such that the 103 to $S_0$ and the 101 to $S_0$ control signals are mutually exclusive, that is if one of said control signal lines is active the other one cannot be active. The control signal line labeled Initiate $T_3$ Sequence from H2651 is not activated since the conditioning signal input to H2651 of Interrupt Flip-Flop=1 is not present. Continuing from the T251 flip-flop 92 through the $T_2$ Sequence it can be seen that H2251 which receives an input from the 1 output side of T251 will activate the control lines labeled Initiate Memory 0, Clear R, Clear P, $W_1$ to R and Arithmetic to $Z_0$. T2551 in response to the output from the 1 side of the T251 flip-flop activates the control signal line labeled Clear Repeat Terminate Flip-Flop and continues the $T_2$ Sequence by setting the T253 flip-flop, 94, in FIG. 10*b*. The former control signal does not serve any useful purpose during this progress through the $T_2$ Sequence since the Repeat Terminate Flip-Flop had not previously been set. The "1" signal level output from the 0 output side of the T253 flip-flop activates the control signal line labeled R to P and the output from the 1 output side of the T253 flip-flop transmitted to T2253 continues the $T_2$ Sequence. It should be noted that at this time that although H2253 does receive a first input from the T253 flip-flop which is of the "0" signal level state the conditioning signal applied thereto labeled R=0 is not effective so that the control signal line labeled Set Quick Exit Flip-Flop is not active. The "1" signal level outputted from T2253 sets the T261 flip-flop 96 to continue the $T_2$ Sequence. It should be noted that in the table no control signals are developed in the $T_2$ Sequence from time slot 5.2 to time slot 8.1. This period of time is reserved for the development of control signals for other types of repeat instructions which are included in the computer instruction repertoire. Other types of repeated function require additional control signals being developed in the time period between time slot 5.2 and 8.1. The $T_2$ Sequence is continued from the T261 flip-flop 96 by the subsequent sequential setting of the T263 flip-flop 98, the T271 flip-flop 100, the T273 flip-flop 102, and the T281 flip-flop 104, the latter shown in FIG. 10*c*. Although there are shown in the figures of the $T_2$ Sequence the control signal lines labeled Clear $F_0$ and Initiate $T_0$ intermediate the T261 flip-flop 96 and the T281 flip-flop 104, neither of these control lines is activated since at least one of the inputs to the respective NOR circuits, H2361 and H2363, is in the "1" signal level state thereby causing the respective NOR circuits to develop "0" signal level outputs so that the respective control signal lines are inactive.

To review the $T_2$ Sequence to this juncture it can be seen that at time slot 4.1 the coded permutations of a unique address equal to 101 (octal) is transmitted to the $S_0$ register and the Control Memory is initiated to read-out the information which is stored at said address. Previously stored at said unique address, either when loading the original set of program instructions into the computer or during the course of prior operation of the program, was the repeat count. Concurrently with initiation of the Control Memory reference cycle the contents of the P register are transmitted to the Arithmetic Section via the transmission path P to Q. At time slot 4.4 the information read-out from the address location in the Control Memory is transmitted from the $Z_0$ register to the $W_1$ register and at time slot 5.2 this information, which is the repeat count, is transmitted from the $W_1$ register to the R register and from the R register to the P register to result in the shift count being temporarily held in the P register. At time slot 5.1 another unique address of 103 (octal) is transmitted to the $S_0$ register and the Control Memory reference cycle is again initiated, recalling that a complete Control Memory reference cycle only requires one time slot so that even though a first memory reference had been initiated at time slot 4.1 a subsequent memory reference can be initiated at time slot 5.1. Concurrent with the initiation of the memory reference cycle, information is transmitted from the Arithmetic Section to the $Z_0$ register. This is the information which had been previously stored in the P register and transmitted to the Arithmetic Section and is the address of the next sequential program instruction. In this manner the said information is stored away at address location 103 in the Control Memory for subsequent use upon termination of the present repeat instruction. Once again it should be recalled that the $T_2$ Sequence initiation from the $T_0$ Sequence is dependent upon the RSU Flip-Flop having been set to the "1" state and the latter in turn is dependent upon the proper coded permutations existing in the operational code portion of the $F_0$ register.

Figure 10C:
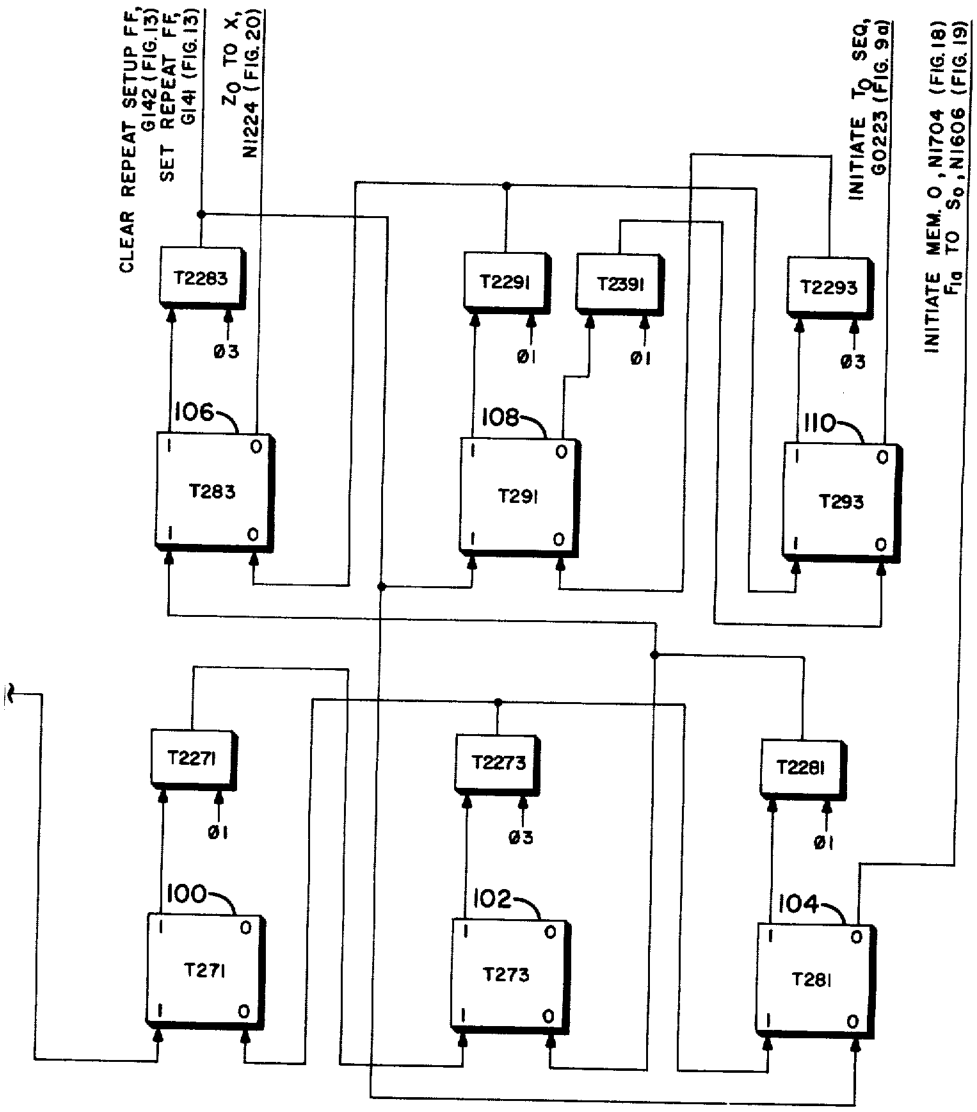

In the continuation of the $T_2$ Sequence at time slot 8.1, the T281 flip-flop 104 in FIG. 10*c* is set so that its 0 output side outputs an activating "1" signal level to the control signal lines labeled $F_{1a}$ to $S_0$ and Initiate Memory 0. The $T_2$ Sequence is continued by the 1 output side of the T281 flip-flop which provides an input to T2281 so that the latter sets the T283 flip-flop 106. From the 0 output side of the T283 flip-flop, control signal line labeled $Z_0$ to X is activated. T2283, receiving an input from the 1 output side of the T283 flip-flop, sets the T291 flip-flop 108 and activates the control signal lines labeled Set Repeat Flip-Flop and Clear RSU Flip-Flop. The subsequent setting of the T293 flip-flop 110 through T2291 at clock phase 1 results in the 0 output side of latter flip-flop activating the control signal line labeled Initiate $T_0$ Sequence at time slot 9.3.

To review the functional operation of the $T_2$ Sequence from time slot 8.1 through time slot 9 it can be seen that development of the $F_{1a}$ to $S_0$ and the Initiate Memory 0 control signals provide the means for initiating a control memory reference to an address location as determined by the designator portion of the $F_1$ register. Previously stored at said address location is the comparator word against which a plurality of operands will be repetitively compared for equality under control of the instant exemplary instruction word. At time slot 8.3 the $Z_0$ to arithmetic control signal developed in the $T_2$ Sequence enables the transmission path of the information read-out of the Control Memory Section to be transmitted to the Arithmetic Section for subsequent use therein to be compared to the various operands. This terminates for the present the requirements of the Repeat Set-Up Sequence, $T_2$, and therefore the RSU Flip-Flop is cleared and since at this time the repeatable function is operable the Repeat Flip-Flop is set and at time slot 9.3 the $T_0$ Sequence is reinitiated to provide the means for developing further control signals required to implement the operation of the instruction.

In describing again the sequences as they are initiated, the means for developing those control signals which were previously described will not be repeated but only the fact that these control signals are again developed will be noted. However, in regard to those control signals, which were not developed in the first pass through each of the sequences or those which are inhibited during the subsequent passes through the sequences, the means for each of these will be described in more detail. Starting then with the time slot 1.1 following time slot 9 in the $T_0$ Sequence, the main command signals $F_{0b}$ to $S_0$ and initiate Memory 0 are generated. Furthermore, the control signal lines labeled Clear $W_1$, $W_2$ and $W_3$ at time slot 1.3 and $F_{0L}$ to $W_3$ as well $Z_0$ to $W_1$ and $W_2$ at time slot 1.4 are activated. Since the Repeat Flip-Flop had been previously set in the $T_2$ Sequence at time slot 8.3, the conditioning signal applied to T0514 is not present so the control signal line labeled Set repeat Set-Up Flip-Flop is not activated. Furthermore, since $f_1$ does not equal 3–, the conditioning signal applied to H0221 is not effective so that control signal lines labeled $F_{1A}$ to $S_0$ and Initiate Memory 0 are also inactive during time slot 2. Even though the unconditioned control signal line labeled Arithmetic to $Z_0$ is active, since no memory reference cycle to the control memory is initiated nothing of any significance occurs as a result of transmission of information from the Arithmetic Section to the $Z_0$ register. The Clear R, IA to R, Clear $W_3$, and $W_2$ to $W_3$ control signals, respectively at time slots 3.1, 3.2 and 3.3 are developed in the $T_0$ Sequence in the same manner as during the first pass through the $T_0$ Sequence. However, the conditioning signals required to activate the control signal lines labeled Initiate $T_2$, Clear $F_1$, and $F_0$ to $F_1$ are not effective since the Repeat Flip-Flop had been previously set and the Repeat Set-Up FF had been previously cleared so these latter control signals are not developed during this pass through the $T_0$ Sequence. Furthermore, the $T_0$ Sequence is allowed to continue from time slot 3 to time slot 4 since the conditioning signal of RSU Flip-Flop=0 applied to T0233 is effective so that a "1" signal is passed into the 1 input side of the T041 flip-flop 60 from the 1 output side of the T033 flip-flop 90. With the T041 flip-flop set, the $T_0$ Sequence is continued via the 1 output side of the T041 flip-flop through T0841 into the 1 input side of the T043 flip-flop 62. Concurrently the 0 output side of the T041 flip-flop 60 outputs a "1" to T0842 which in turn provides a first "0" signal level input to H0541. The other input to the latter NOR circuit being the conditioning signal of $f_0$=6– is effective so that the control signal lines labeled, respectively, R to $S_1$, Initiate Memory 1, and Set $Z_1$ to X Flip-Flop are activated at time slot 4.1. The control signal lines labeled, respectively, Set $Z_1$ to $F_0$ Flip-Flop, P to $S_1$, Initiate Memory 1, and Set P Designator Flip-Flop, all being controlled by the output from H0441, are not activated since the conditioning signal input to H0441 of Repeat Flip-Flop=0 is not active. The control signal lines labeled $F_{1A}$ to $S_0$ and Initiate Memory 0 from H0742 also are inactive because of the inactive state of the conditioning signal applied to the input of H0742 of $f_1$=3–. Even though the control signal line labeled $Z_0$ to X is activated from the 0 output side of the T043 flip-flop, since no Control Memory reference cycle is initiated the enabling of this transmission path is of no effect.

From the 1 output side of the T043 flip-flop 62, T0243 provides a "1" signal level to the T051 flip-flop 64 to set it. A "1" signal level output from the 0 output side of the T051 flip-flop causes T0751 to develop a "0" signal level input to T0351. The first conditioning signal input to T0351 of Repeat Terminate Flip-Flop=0 is effective since the latter had not been set at any time previous to now. As will be described later in more detail, the Enable P conditioning signal input to T0351 is also active since it is dependent upon the condition that the P Designator Flip-Flop=0 and the Repeat Flip-Flop=1. Therefore, at time slot 5.1, T0351 outputs a "1" signal level to activate the control signal line labeled Initiate $T_3$ Sequence. Concurrently therewith from the 1 output side of the T051 flip-flop 64 a "0" signal level is applied to the input of H0251 and this coupled with the conditioning signal of Repeat Terminate Flip-Flop=0 results in H0251 activating the control signal lines labeled respectively $F_{0b}$ to $S_0$ and Initiate Memory 0 at time slot 5.1. Concurrently therewith the T053 flip-flop 66 is set by a "1" signal level input to the 1 input side from T0251 to continue the $T_0$ Sequence. From the 1 output side of the T053 flip-flop a "0" signal level into T0853 results in the latter developing a "1" signal to activate the control signal line coupled to the output thereto labeled IA to $Z_{0L}$ at time slot 5.2. The T061 flip-flop 74 is set by an output from T0253 and from the 1 output side of the latter flip-flop through T0361 and H0263 a first "0" level signal is applied to the input of H0763. The other input to the latter NOR circuit, being the conditioning signal of $Z_1$ to X Flip-Flop=1, the latter flip-flop having previously been set at time slot 4.1, activates the control signal line labeled $Z_1$ to X. The control signal lines labeled respectively, $Z_1$ to $F_0$, Initiate $T_2$ Sequence, and Clear $F_0$ all being dependent upon conditioning signals respectively of $Z_1$ to $F_0$ Flip-flop=1, Repeat Terminate Flip-Flop=1 and Repeat Flip-Flop=0 are all inactive since said conditioning signals are not effective. However, the $T_0$ Sequence is reinitiated via G0253 at time slot 6.3 in the same manner as previously described. To review then the $T_0$ Sequence as described immediately above, during time slot 1 the modification of the *u* portion of the instruction word by the address-modifier word contained in the Control Memory at the address as designated by the *b* designator is initiated and the results of the modification are transmitted from the Index Adder to the R register during time slot 3. At time slot 4 the modified address is transmitted to the Storage Address register for the Core Memory, $S_1$, and a core memory reference cycle is initiated to read-out the operand that is stored at the said address location. Finally during time slot 6 the information stored at this address, which is the operand, is transmitted from the Core Memory Transfer register, $Z_1$, to the X register in the Arithmetic Section where the particular arithmetic operation is performed on this information, which in this instance is a compare-for-equality operation. During this same period of time the lower half of the address-modifier word is modified by the upper half of said word through the Index Adder and the results thereof are stored back into the Control Memory at the same address location as designated by the *b* designator portion of the instruction word by transmitting the information from the Index Adder to the Control Memory Transfer register, $Z_0$, and initiating a control memory reference to the proper address at time slots 5.1 and 5.2.

Figure 11A:
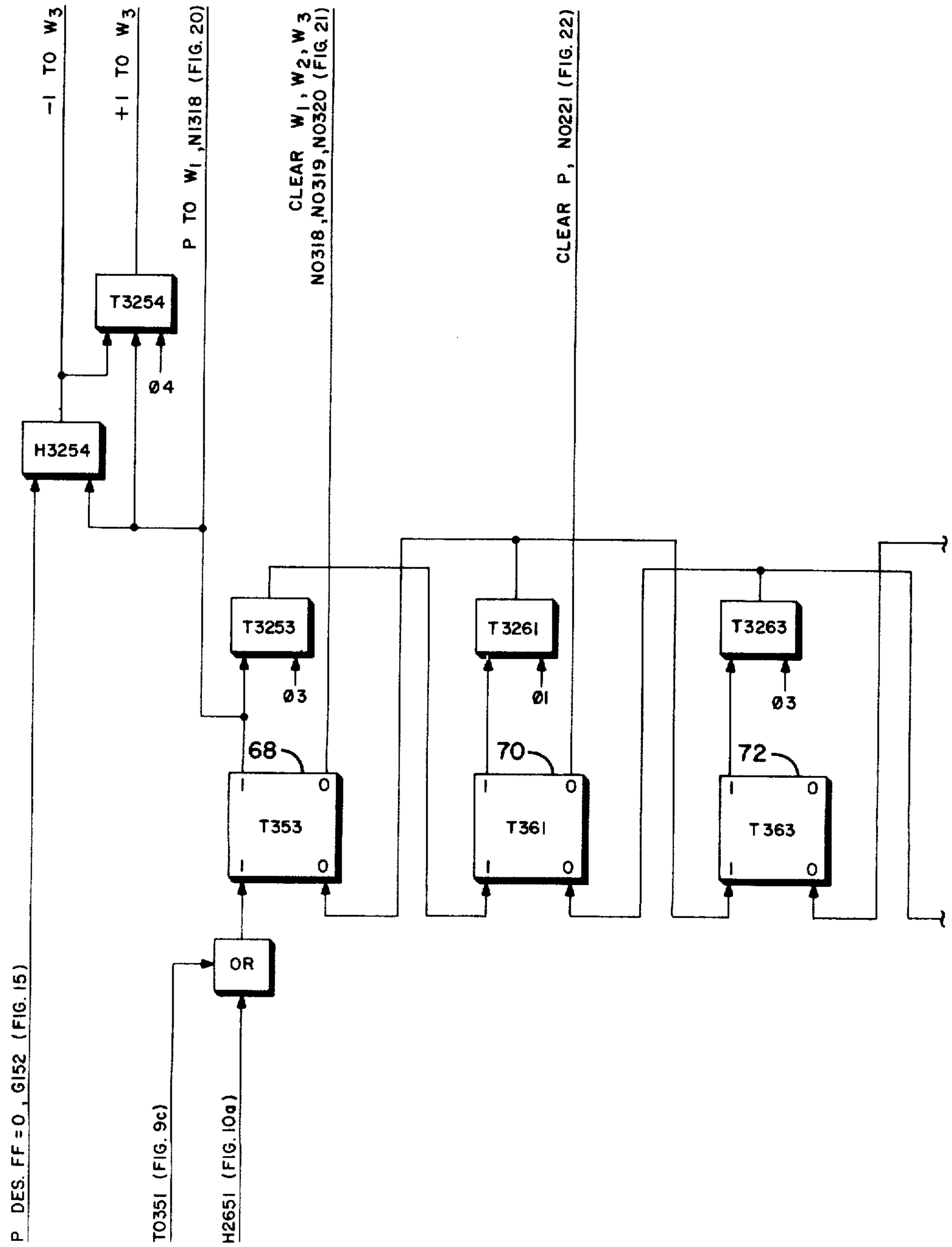
Figure 11B:
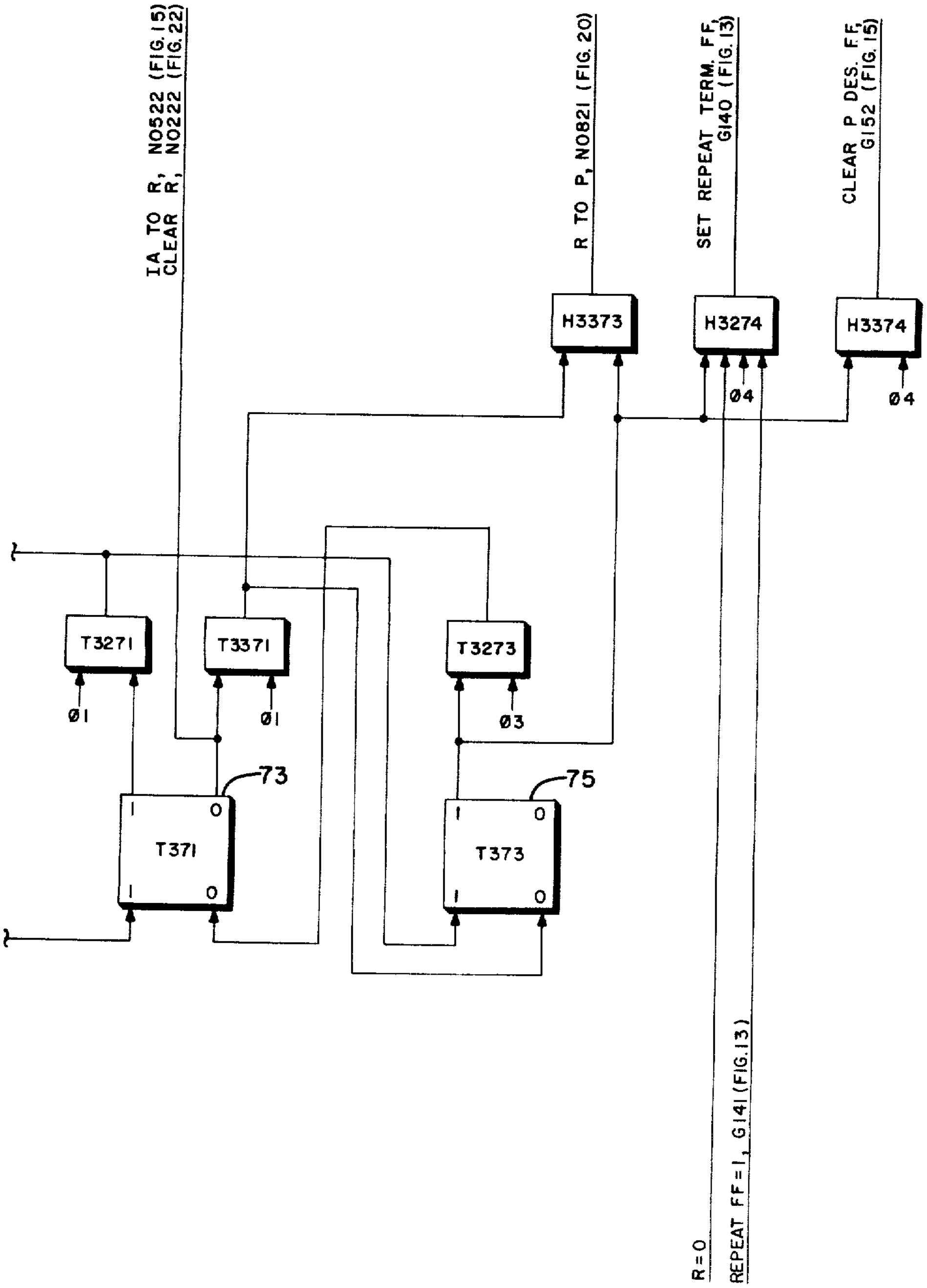

In response to the control signal developed in the $T_0$ Sequence at time slot 5.1 by T0351, the T353 flip-flop 68 in the circuit diagram for the $T_3$ Sequence, FIG. 11*a*, is set to initiate the $T_3$ Sequence. The "0" signal level outputted from the 1 output side of the T353 flip-flop activates the control signal line P to $W_1$ and provides a first input to H3254 as well as to T3254. At the present time, however, the conditioning signal applied as another input to H3254 of P Designator Flip-Flop=0 is active so that H3254 outputs a "1" signal level to activate the control signal line labeled −1 to $W_3$. This "1" signal level output also provides an input to T3254 and forces the latter NOR circuit to output a "0" signal level on the control signal line labeled +1 to $W_3$ thereby making it inactive. The Clear $W_1$, $W_2$ and $W_3$ control signal line from the 0 output side of the T353 flip-flop is also activated as during the previous pass through the $T_3$ Sequence. Likewise the control signal lines labeled Clear P, Clear R, IA to R, R to P, and Clear P Designator Flip-Flop are activated in their proper sequential order as previously described. Functionally then, in this pass through the $T_3$ Sequence, recalling that the P register contains the repeat count, said repeat count value is decremented by one through the Index Adder and the result is replaced in the P register. Shown in the table; FIG. 8*c*, at time slot 1.4 in the $T_3$ Sequence is a parenthesized control signal Set Repeat Terminate Flip-Flop. The control signal line similarly labeled in FIG. 11*b* receives an activating signal from H3274 under the proper conditioning signals applied at the input thereto. One of the conditioning signals is Repeat Flip-Flop=1 which is active during the present pass through the $T_3$ Sequence. The other conditioning signal is R=0. During the $T_3$ Sequence, the R register temporarily stores the shift count in transmitting said decremented shift count from the Index Adder to the P register and by sensing the contents of the R register it can be determined whether one of the conditions of the termination of the repeating function have been met, that condition being the repeat count value reduced to 0. For the interim we shall consider that not to be the case but that case will be considered subsequently.

Returning now to the $T_0$ Sequence, in the table FIG. 8*c*, which continues concurrently with the $T_3$ Sequence described immediately above, it can be seen that starting at time slot 1.1 following time slot 6 that the same control signals are sequentially developed to the $T_0$ Sequence as those developed during the previously described $T_0$ Sequence starting with time slot 1.1 following time slot 9. Assuming then that none of the conditions for terminating the repeating function are present under control of the instruction word contained in the $F_0$ and $F_1$ registers, the same control signals are developed in their proper sequential order in the $T_0$ and $T_3$ Sequences, repetitively at time slots 1 through 6. The result is that operands are repetitively obtained from the Core Memory Section and compared to the comparator in the Arithmetic Section and each time this function is performed the repeat count is reduced by one.

It is at time slot 4 in the $T_0$ Sequence that the branching off for various conditions for discontinuing the repeating function is done. This BRANCHING POINT is indicated in FIG. 8*d*. The first conditional discontinuance to be described will be termination of the repeat operation when the repeat count has been reduced to 0, that is, when in the course of the $T_3$ Sequence the control signal line labeled Set Repeat Terminate Flip-Flop is activated in response to the sensing of the contents of the R register being equal to zero. At the time slot 4 in the $T_0$ Sequence following the time slot 3 in which the *u* portion of the instruction word has been modified, again a Core Memory reference cycle is initiated to read the information stored in the address location as designated by the contents of the $S_1$ register and the control signal line labeled $Z_1$ to X flip-flop is also activated. However, during time slot 5 in response to the setting of the T051 flip-flop 64 in the $T_0$ Sequence shown in FIG. 9*c*, T0351 will not activate the control signal line labeled Initiate $T_3$ Sequence. One of the conditioning signals applied at the input to T0351, the conditioning signal of Repeat Terminate Flip-Flop=0 is not active. Similarly the control signal lines receiving an output from H0251 which are labeled $F_{0b}$ to $S_0$ and Initiate Memory 0 are likewise inactivated because of the same conditioning signal of Repeat Terminate Flip-Flop=0 providing one of the inputs to H0251. So even though the unconditional activating of the control signal line labeled IA to $Z_{0L}$ does take place at time slot 5.2, it is of no significance since no memory reference cycle to the Control Memory is initiated. The $T_0$ Sequence, continued by the setting of T061 flip-flop and H0763, does activate the control signal line labeled $Z_1$ to X but by means not shown, in the Arithmetic Section, the information transferred from the core memory transfer register, $Z_1$, to the X register in the Arithmetic Section is ignored. In response to the setting of the T063 flip-flop 76 in the course of the continuation of the $T_0$ Sequence, the signal outputted from the 1 output side of the T063 flip-flop and applied as the first input to T0463 is coupled with the conditioning signal of Repeat Terminate Flip-Flop=1 which is effective to activate the control signal line labeled Initiate $T_2$. At the same time since the conditioning signal of Repeat Terminate Flip-Flop=0 is not effective, reinitiation of the $T_0$ Sequence is inhibited through H0464.

Referring now to FIG. 10*a* of the circuit diagram of the $T_2$ Sequence in conjunction with the table listings of FIG. 8*d* in the $T_2$ Sequence column, the OR input to the T241 flip-flop 81 from T0463 in the $T_0$ Sequence sets said latter flip-flop to initiate the $T_2$ Sequence. As with the prior pass through the $T_2$ Sequence the control signal lines labeled Initiate Memory 0, Clear Repeat In Progress Flip-Flop, and P to Q are activated upon the setting of the T241 flip-flop. Since the conditioning signal of the RSU Flip Flop=1 is not effective, H2341 outputs a "0" signal so that the control signal line labeled 101 to $S_0$ is not active. However, H2241 receiving a first input from the 1 output side of the T241 flip-flop and a second input from the output of H2341 activates the control signal line labeled 103 to $S_0$. The control signals occurring at time slots 7.3 and 7.4 which are respectively, Clear $W_1$, $W_2$, and $W_3$ and $Z_0$ to $W_1$ are developed in this pass through the $T_2$ Sequence in the same manner as in the prior pass through said sequence. At time slot 8.1, since the conditioning signal input to H2451 of RSU Flip-Flop=1 is not effective, the control signal line labeled 103 to $S_0$, being an output from said latter NOR circuit, is not active. However, H2551 which receives a first input from the output of H2451 and a second input from the output of H2951, activates the control signal line labeled 101 to $S_0$. The control signals of Initiate Memory 0, Arithmetic to $Z_0$, Clear R and Clear P at time slot 8.1 and $W_1$ to R, and Clear Repeat Terminate Flip-Flop at time slot 8.2 as well as R to P at time slot 8.2 are developed in the manner previously described. The T261 flip-flop 96 is set in the normal manner during the continuation of the $T_2$ Sequence. Sail flip-flop outputs a signal from the 1 output side to provide a first input to H2361. A conditioning signal of the RSU Flip-Flop=1 is applied to the input of H2261 and the output thereof provides a second input to H2361. Since the latter conditioning signal is not effective, H2261 outputs a "0" signal level so that H2361 activates the control signal line labeled Clear $F_0$. The T263 flip-flop is set by the signal passing from the 1 output side of the T261 flip-flop through T2261 to continue the $T_2$ Sequence. A first output from the 1 output side of T263 provides a first input to H2363 and the second input to the latter NOR circuit is the conditioning signal of the RSU Flip-Flop=0. Since this conditioning signal is effective, H2363 activates the control signal line labeled $T_0$ to reinitiate the $T_0$ Sequence. Concurrently the continuation of the $T_2$ Sequence is terminated since the conditioning signal applied to H2263 through which the $T_2$ Sequence is normally continued is the RSU Flip-Flop=1 and since said flip-flop is now in the "0" state, H2263 outputs a "0" signal level and does not set the next sequential flip-flop T271, 100.

To review briefly now the function of the second pass through the $T_2$ Sequence, it first should be recalled that during the first pass through said sequence the address of the next sequential instruction in the program which had been held in the P register was stored at address location 101 in the Control Memory and the repeat count which had been stored at address location 103 in the Control Memory was called out of the Control Memory and placed in the P register. This was done preparatory to initiation of the repeating function. When the conditions for terminating the repeating function is sensed, i.e., when the repeat count value is zero, the $T_2$ Sequence is again *initiated* only during this pass the first step is to place the repeat count value, now equal to zero, which is in the P register, back in its original storage location, address 103, in the Control Memory and secondly to obtain the stored away address of the next sequential program instruction from address 101 in the Control Memory preparatory to reinitiating the normal program operation.

Referring back again to FIG. 9*a* to the $T_0$ Sequence, the control signal of Initiate $T_0$ Sequence from H2363 in the $T_2$ Sequence in passing through the G0223 and G0253 sets the G053 flip-flop 78 to reinitiate said sequence at time slot 1.1 following time slot 8. Although some of the control signals previously described in the $T_0$ Sequence during time slots 1, 2 and 3 are again developed in the $T_0$ Sequence during this pass through said sequence, for the most part these are of no consequence primarily because the controlling instruction word in the $F_0$ register is no longer present since $F_0$ had been previously cleared during the $T_2$ Sequence. The only developed control signals of any significance in the first three time slots of this pass through the $T_0$ Sequence are the Clear $F_1$ control signal at time slot 3.3 and the $F_0$ to $F_1$ control signal developed at time slot 3.4. This results in the $F_1$ register also being cleared. In a manner similar to that described in relation to the first pass through the $T_0$ Sequence, starting with time slot 4 at the beginning of the table, the control signals labeled P to $S_1$, Initiate Memory 1, set P Designator Flip-Flop, and set $Z_1$ to $F_0$ Flip-Flop, are all developed by H0441 at time slot 4.1. Similarly the control signal lines labeled $F_{1A}$ to $S_0$, Initiate Memory 0, and $Z_0$ to X are likewise activated but since the $F_1$ register is now cleared, these control signals are of no consequence and so are not listed in the table. The $T_0$ Sequence continues through time slots 5 and 6 concurrently with the initiation of the $T_3$ Sequence as previously described. The effect of this last pass through the $T_0$ Sequence is to place the coded permutations for the address of the next sequential program instruction into the Core Memory Storage Address Register, $S_1$ from the P register, recalling that this particular address had previously been put into the register during the $T_2$ Sequence, and the instructoin stored at said memory location in the Core Memory is transferred from the memory transfer register, $Z_1$, to the $F_0$ register. Concurrently therewith the contents of the P register are incremented by one so that the P register now contains the coded permutations of the address of the next sequential instruction in the program. From time slot 6 the $T_0$ Sequence is reinitiated at time slot 1 and it is through the repetitive continuation of the $T_0$ Sequence and the $T_3$ Sequence that the continued normal progress of the series of program instructions is continued in proper sequential order.

Referring back again to the BRANCHING POINT in FIG. 8*d*, it should be recalled that the description immediately above was in relation to the sensing for a condition for termination of the repeating instruction, that is, where the repeat count had been reduced to zero. Another condition for discontinuing the repeating instruction, which is common to all of the repeat instructions in the instruction repertoire of the given computer, occurs when the normal computer operation is interrupted, for example by a request for external equipment for establishing communication with the computer. The control signals contained in brackets in the table following the BRANCHING POINT time slot are those control signals which are developed as a result of the sensing of the Interrupt Signal and in all instances, except one, these control signals are developed in addition to the other control signals listed in the table. The single exception will be subsequently pointed out. It should be noted that for this interrupt condition it is assumed that the previously described terminating condition of the repeat count equal to zero is not true. Referring again to FIG. 9*c* of the $T_0$ Sequence the T043 flip-flop 62 is set in the normal course of events in the $T_0$ Sequence. The "1" signal level outputted from the 0 output side of said flip-flop provides an input to T0943 which in turn develops a "0" signal level output signal to provide a first input to H0243. The two conditioning signals also applied to the input of H0243 are Repeat Flip-Flop=1 and Interrupt Request=1. The former conditioning signal, of course, is still effective and the latter is also effective under the assumption that an interrupt signal has been generated by the computer Input-Output Section 12 in FIG. 1, detected by means adapted to sense the occurrence of an interrput condition. As a result H0243 activates the control signal lines labeled Set Interrupt Flip-Flop and Set Repeat Terminate Flip-Flop at time slot 4.3. In continuing through the $T_0$ Sequence when the T063 flip-flop 76 is set, the 1 output side thereof provides a first signal input to T0463. Since the conditioning signal applied to T0463 of Repeat Terminate Flip-Flop=1 is active, said Repeat Terminate Flip-Flop having previously been set at time slot 4.3, T0463 activates the control signal line labeled Initiate $T_2$ Sequence at time slot 6.3. As a result of initiating the $T_2$ Sequence the same control signals which were developed in the $T_2$ Sequence in response to the initiation of said sequence upon the previously described terminating condition are again developed as listed in the table and as previously described. One additional control signal is developed in the pass through the $T_2$ Sequence which is the control signal Initiate $T_3$ Sequence at time slot 8.1. The means for developing this latter control signal are shown in FIG. 10*a*. The same "0" level signal from H2951 into H2551 provides a first input into H2651 and the second input thereto is a conditioning signal Interrupt Flip-Flop=1. The latter flip-flop having been previously been set to "1" at time slot 4.3 in the $T_0$ Sequence in this conditioning signal being effective so that H2651 activates the control signal line labeled Initiate $T_3$ Sequence. The initiation of the $T_3$ Sequence resulting from an interrupt condition performs the same function as previously described with relation to the termination of the repeat in response to the repeat count being reduced to zero. The $T_3$ Sequence during this pass develops the same control signals as were developed in reducing the repeat count value which is held in the P register. These have been previously described. However, it should be noted that at the beginning of this pass through the $T_3$ Sequence, the P register now contains the address of the next sequential instruction in the program, and it is this address which is reduced by one in the Index Adder and placed back in P under control of the control signal developed in the $T_3$ Sequence. This new address now is the memory location of the repeat function instruction. In this manner, when the subroutine which is initiated by an interrupt signal is eventually terminated due to the condition for interrupt being no longer effective, there is provided the means for calling out the Core Memory Section the repeat instruction word so that said instruction can be reinitiated at the same juncture at which it had been interrupted.

As shown in the table and as previously described, the $T_0$ Sequence is initiated from the $T_2$ Sequence and is active concurrently in part with the $T_3$ Sequence. At time slot 4.1 there occurs the control signal, mentioned briefly above, resulting from the instant conditional interruption of the repeating instruction which occurs in lieu of one of the other control signals. Instead of the P to $S_1$ control signal being initiated, the coded permutation of a fixed address is transmitted to the $S_1$ register, by means not shown, under control of the interrupt sensing means. This provides a starting address of a subroutine to control computer operations for effecting the communication with the peripheral equipment in response to the interrupt request. For ease in understanding it can be assumed that during this subroutine the control signals required for the operation of the repeating instruction are not developed in their respective sequences, however, upon termination of this subroutine the repeat instruction word is called out of its memory location and reinitiates control of the computer to effect performance of the repeat function.

The means for developing the conditioning signals for the sequences will now be described. These conditioning signals appear on the appropriately labeled conditioning signal input lines at the bottom of each of the FIGURES 9, 10 and 11, of the sequence circuits. These conditioning signals will be described in the order of their occurrence starting with the leftmost conditioning signal input line into FIG. 9*a* of the $T_0$ Sequence and continuing through that sequence from left to right and followed successively in the same order through the $T_2$ Sequence of FIG. 10 and the $T_3$ Sequence of FIG. 11. In the figures each of the conditioning signal input lines references the origin of the conditioning signal and each of the signal output lines from the conditioning signal developing means is labeled in accordance with its destination in the sequence circuit figures.

The conditioning signal of $f_0$=62 results from the translation of the function code portion of the instruction word as contained in the six most significant bits in the $F_0$ register, bits 35–30, and may be accomplished by any means well known in the art. FIG. 12 shows means utilized in the instant embodiment of the invention for the translation. The six flip-flops, 112, 114, 116, 118, 120 and 122, comprise the upper six bits of the $F_0$ register 28 shown in FIG. 1, and store the coded permutations of the function code of the instruction word. The three flip-flops 112, 114 and 116, which respectively store the binary value of bits 30, 31 and 32 each provide an input to the NOR circuit 124 labeled E0292. Flip-flops 112 and 116 provide output signals from the 0 output sides as inputs to NOR circuit 124 whereas flip-flop 114 outputs from the 1 output side a signal input into NOR 124. It can be seen then that if the three flip-flops 112, 114 and 116, are respectively in the "0," "1" and "0" states all three signal inputs to NOR 124 would be of the "0" signal level resulting in a "1" signal level outputted by NOR 124 which in turn is inverted through NOR circuit 126 labeled E0399 to activate the output line therefrom labeled –2. It should be noted at this juncture that in general the conditioning signals, when active, are in the "0" signal state as distinguished from the control signals which, when active, are in the "1" signal state. The activation of the conditioning signal line labeled –2 indicates that the coded permutations of the three lowest order bits in the function code portion of the instruction word in the $F_0$ register, is equal to octal 2. Flip-flops 118, 120 and 122 which respectively store the coded permutations of the upper three bits of the function code portion of the instruction word in the $F_0$ register, bits 33, 34 and 35, respectively, in a similar manner provide outputs into the NOR circuit 128 labeled E0269, so that when the coded permuation of said upper three bits is equal to octal 6, NOR circuit 128 outputs a "1" signal level which is inverted through NOR circuit 130 labeled E0369 to activate the conditioning signal line labeled –6. The signal lines labeled –2 and 6– in turn provide the two inputs to the NOR circuit 132 labeled E2333 which in turn outputs a "1" signal level when both of the inputs thereto are of the "0" signal level and in turn through NOR circuit 134 labeled E2315 the conditioning signal line labeled $f_0$=62 is activated.

Figure 13:
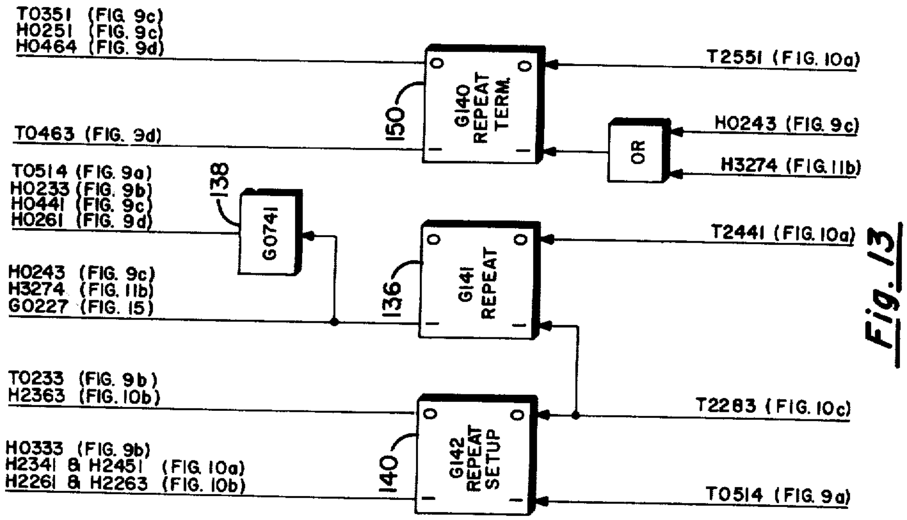

Referring now to FIG. 13 there is shown the Repeat Flip-Flop 136 from which is derived the conditioning signal of Repeat Flip-Flop=0. With the Repeat Flip-Flop in the "0" state, the 1 output side outputs a "1" signal into the NOR circuit 138 labeled G0741 which in turn outputs a "0" signal to activate the conditioning signal line labeled Repeat Flip-Flop=0. When the Repeat Flip-Flop is in the "1" signal state, the 1 output side outputs a "0" signal level to activate the conditioning signal line labeled Repeat Flip-Flop=1.

The conditioning signal of $f_1$=3– is developed in a manner similar to that for the signal of $f_0$=62 as previously described. The upper three bits of the $F_1$ register 30 of FIG. 1 are translated and when the coded permutations contained therein are equal to octal 3, the conditioning signal line is activated.

The Repeat Set-Up Flip-Flop 140 in FIG. 13 develops the conditioning signals of RSU Flip-Flop=1 and RSU Flip-Flop=0 in a manner similar to that described in relation to the Repeat Flip-Flop=0 conditioning signal. When said flip-flop is in the "1" state, the 1 output side activates the signal line labeled RSU Flip-Flop=1 and when in the "0" state, the 0 output side activates the conditioning signal line labeled RSU Flip-Flop=0.

The translation of the operational code portion of the instruction word contained in the $F_0$ register to develop a conditioning signal of $f_0=6-$ was previous described in relation to the means for developing the conditioning signal of $f_0=62$.

Figure 14:
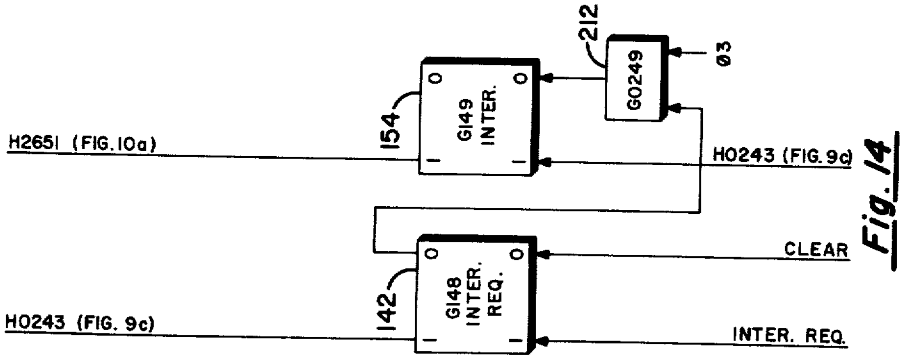

The Interrupt Request Flip-Flop 142 shown in FIG. 14 activates the conditioning signal line labeled Interrupt Request Flip-Flop=1 by outputting a "0" signal level on said conditioning signal line from the 1 output side when in the "1" state. This flip-flop is set by an input thereto labeled Interrupt Request applied to the 1 input side. This setting input line is activated by means not shown which is included in the Input-Output Section 12 of FIG. 1 in response to an interrupt signal transmitted from an external device to the computer. The clearing input to the Interrupt Request Flip-Flop 142 is an input to the 0 side of the flip-flop by another signal generated by the Input-Output Section passing through the NOR circuit 144 labeled G0248.

Figure 15:
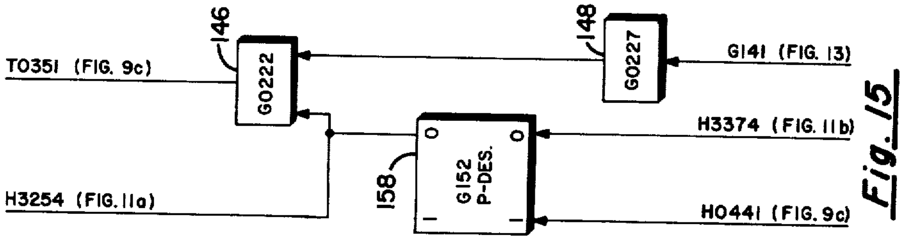

Enable P is one of the conditioning signals in the $T_0$ Sequence control signal in the $T_0$ Sequence. As shown in FIG. 15, the Enable P conditioning signal line is activated by NOR circuit 146 labeled G0222 if either the P Designator Flip-Flop=1 or if the Repeat Flip-Flop=1. If the Repeat Flip-Flop=1, the "0" signal level input into NOR circuit 148 labeled G0227 is inverted and applied as a "1" signal level input into NOR circuit 146 to activate the Enable P conditioning signal line. If the P Designator Flip-Flop is in the "1" state, the input to NOR circuit 146 labeled P Designator Flip-Flop=0 is in the "1" signal level state and this also will result in the Enable P conditioning signal line being activated. Only if both the P Designator Flip-Flop and the Repeat Flip-Flop are in the "0" states will NOR circuit 146 receive both inputs of the "0" signal level to output a "1" signal level and thereby inactivate the Enable P conditioning signal line.

The Repeat Terminate Flip-Flop 150 in FIG. 13 provides a first output from the 1 output side which when in the "0" signal state activates the conditioning signal line labeled Repeat Terminate Flip-Flop=1 and another output from the output side which when in the "0" signal level activates the conditioning signal labeled Repeat Terminate Flip-Flop=0.

Figure 16:
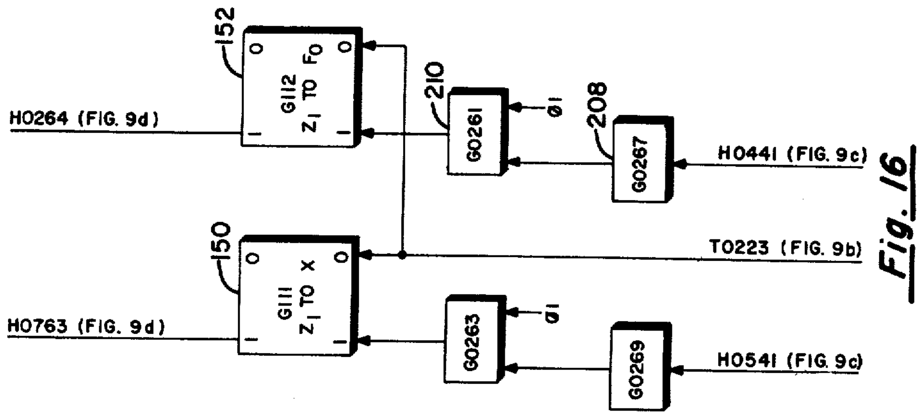

The two remaining conditioning signal inputs to the $T_0$ Sequence of, respectively, $Z_1$ to X Flip-Flop=1 and $Z_1$ to $F_0$ Flip-Flop=1 are developed in the usual manner as shown in FIG. 16, by conditioning signal outputs from the 1 output side of the respective flip-flops 150 and 152.

Returning now to the circuit of the $T_2$ Sequence in FIG. 10, the means for developing the conditioning signal inputs thereto which have not been previously described will now be described. The Interrupt Flip-Flop 154 in FIG. 14 when set outputs a "0" signal level from the 1 output side thereof to activate the conditioning signal line labeled Interrupt Flip-Flop=1. The means for developing the conditioning signal labeled R=0 are not shown since it is merely a translation of the contents of the R register whereby when all of the bits in the R register are in the "0" state said conditioning signal is developed.

Figure 17:
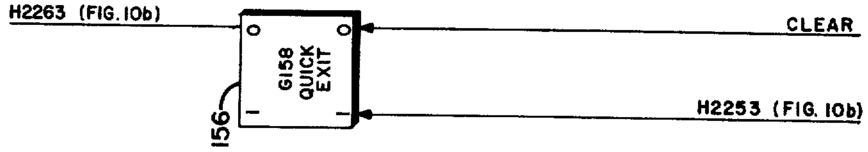

The remaining conditioning signal input to the $T_2$ Sequence is that labeled Quick Exit Flip-Flop=0. The Quick Exit Flip-Flop 156 in FIG. 17 is set during the $T_2$ Sequence on the condition that the shift count is equal to 0, that is, where the contents of the R register is equal to 0 at a particular time. The reason for this is that if during the repeat set-up operation, as controlled by the $T_2$ Sequence, the repeat count value is equal to 0 so that effectively no repeat operation will be performed, the time usually devoted to setting up is conserved by initiating the $T_0$ Sequence from the $T_2$ Sequence at a time earlier than usual. This is controlled by the condition of the Quick Exit Flip-Flop which when in the 0 state activates the conditioning signal line labeled Quick Exit Flip-Flop=0 from its 0 output side.

The only conditioning signal input to the $T_3$ Sequence not previously described is that of P Designator Flip-Flop=0 and this conditioning signal results when said flip-flop 158 in FIG. 15 is in the "0" state so that its 0 output side outputs a signal of the "0" signal level.

Figure 18:
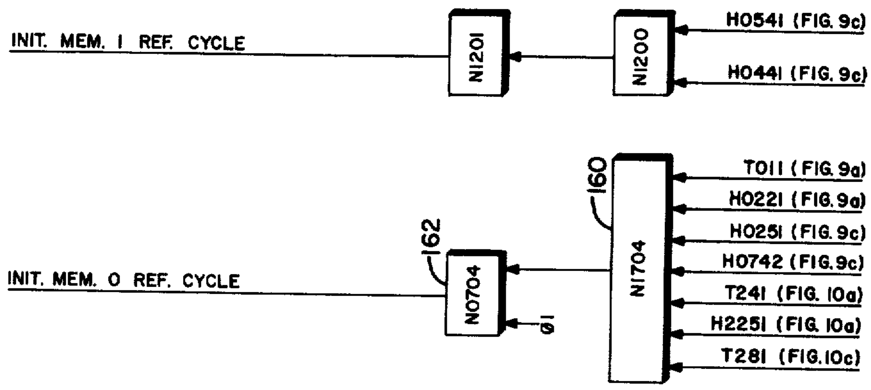
FIGS. 18–22 show circuits for developing signals to control computer functions in response to the command and subcommand signals of FIGS. 9–11.

There remains to be described the means for effecting those functions required in response to the developed control signals in each of the sequences. These will not be described in the order of the occurrence of the respective control signals in the sequences since many of the control signals are developed a plurality of times in a given sequence or in the three sequences combined. In FIG. 18, NOR circuit 160 labeled N1704 has seven separate input lines thereto and in tracing these input lines back to their origin as labeled in the figure, it will be seen that four of these inputs come from the $T_0$ Sequence and the other three are control signal lines from the $T_2$ Sequence. If any of these input lines is active, that is, of the "1" signal level state, N1704 outputs a "0" signal level which is fed to the input of NOR circuit 162 labeled N0704. The latter in turn in response to the input activates its output line labeled Initiate Memory 0 Reference Cycle. As previously stated, since the internal workings of each of the memory sections is not described in detail in the instant specification, suffice it to say that each of the memory sections includes means adapted to respond to the initiation signal to control the read and write operations of the Memory Reference Cycle.

Figure 19:
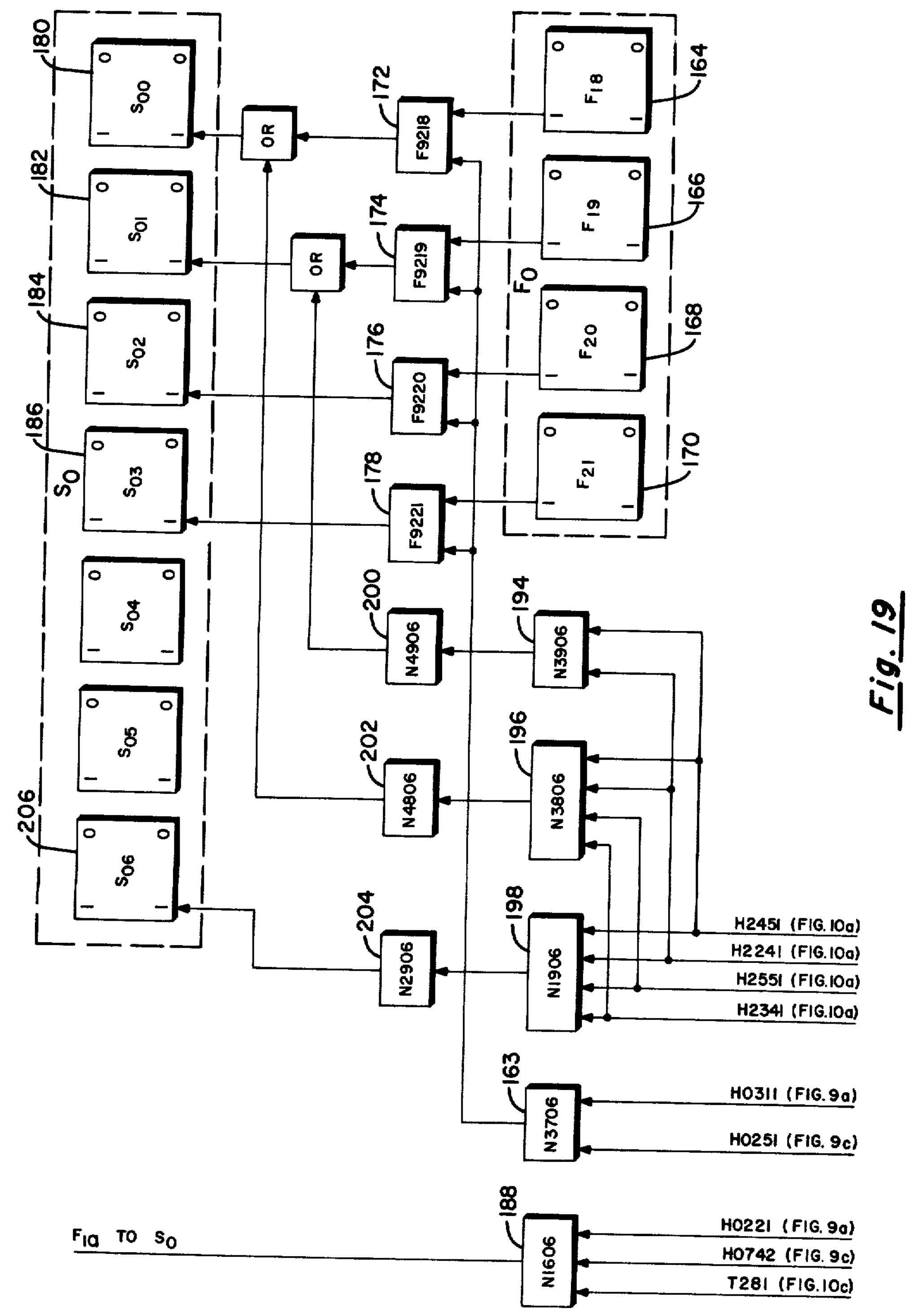

In FIG. 19, NOR circuit 163 labeled N3706 has two input lines thereto both of which are control signal lines from the $T_0$ Sequence circuit FIGS. 9*a* and *c*. If either of these input lines is active, N3706 outputs a "0" signal level to control the transmission path labeled $F_{0b}$ to $S_0$ in FIG. 1. The four flip-flops, 164–170, represent stages 18 through 21 of the $F_0$ register. Each of said flip-flops provides a first input to corresponding NOR circuits 172–178 from their 1 output sides. The second input to each of the NOR circuits is the signal developed by N3706, NOR circuit 163. The four flip-flops, 180–186 represent the stages 0–3 of the $S_0$ register and each has an input to the 1 input side thereof from the corresponding NOR circuits 172–178. It can be seen then, assuming the $S_0$ register is originally cleared, that when the output from NOR circuit 163 is of a "0" signal level in response to the $F_{0b}$ to $S_0$ control signal developed in the $T_0$ Sequence, that the signal state of stages 18–21 of the $F_0$ register will place the respective stages, 0–3, of the $S_0$ register in the corresponding state and in this manner the coded permutations of the *b* designator of the instruction word are transmitted from the $F_0$ register to the $S_0$ register. The above described means for gating the transmission path between registers is only intended to be illustrative and not limitive. Similar means can and, in general, are utilized in gating the transmission paths between the various registers and sections of the computer. Therefore, it is felt that the illustrative description above will suffice for all transmission paths so that the transmission path gating between other registers and sections will not be further described in detail.

Figure 20:
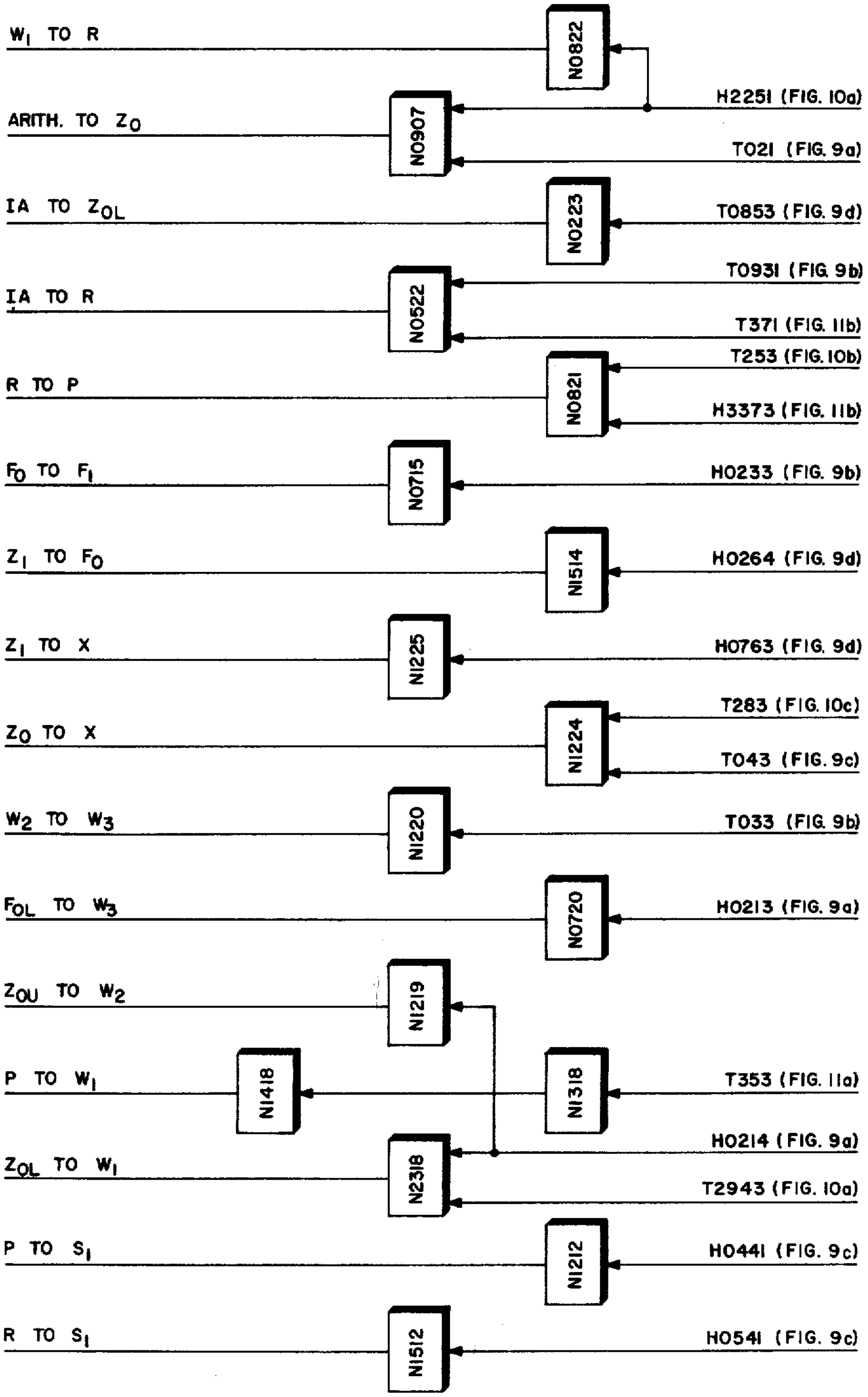
Figure 22:
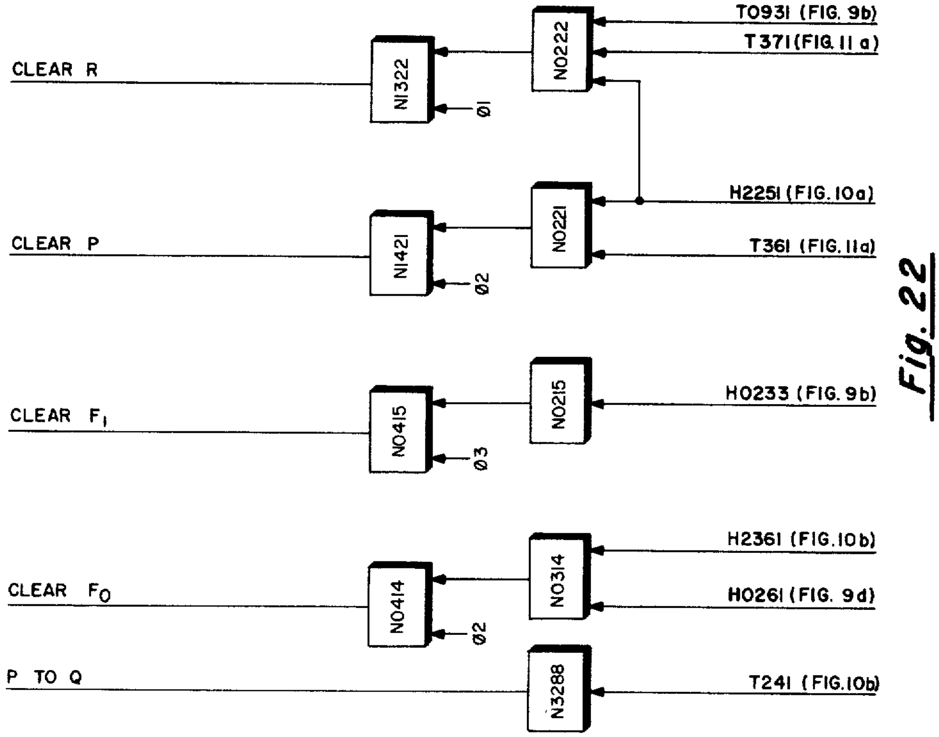

In FIG. 19, NOR circuit 188 labeled N1606 has two input control signal lines from the $T_0$ Sequence and one from the $T_2$ Sequence. If any of said control signal lines is activated, NOR circuit 188 responds by outputting a signal to gate the $F_{1a}$ to $S_0$ transmission path. In FIG. 20 it can be seen that the gating signals for the remainder of the transmission paths including those for transmission paths $Z_1$ to $F_0$, $F_0$ to $F_1$, R to P, IA to $Z_{0L}$, Arithmetic to $Z_0$, $W_1$ to R, R to $S_1$, P to $S_1$, $Z_{0L}$ to $W_1$, P to $W_1$, $Z_{0U}$ to $W_2$, $F_{0L}$ to $W_3$, $W_2$ to $W_3$, $Z_0$ to X and $Z_1$ to X, are all developed in response to control signals generated in the sequence circuits in a manner similar to that described in relation to the developing of the $F_{0b}$ to $S_0$ and $F_{1A}$ to $S_0$ transmission path gating signals. Therefore, no further detailed description is required. This also holds true as regards the P to Q gating signal as shown in FIG. 22.

Figure 21:
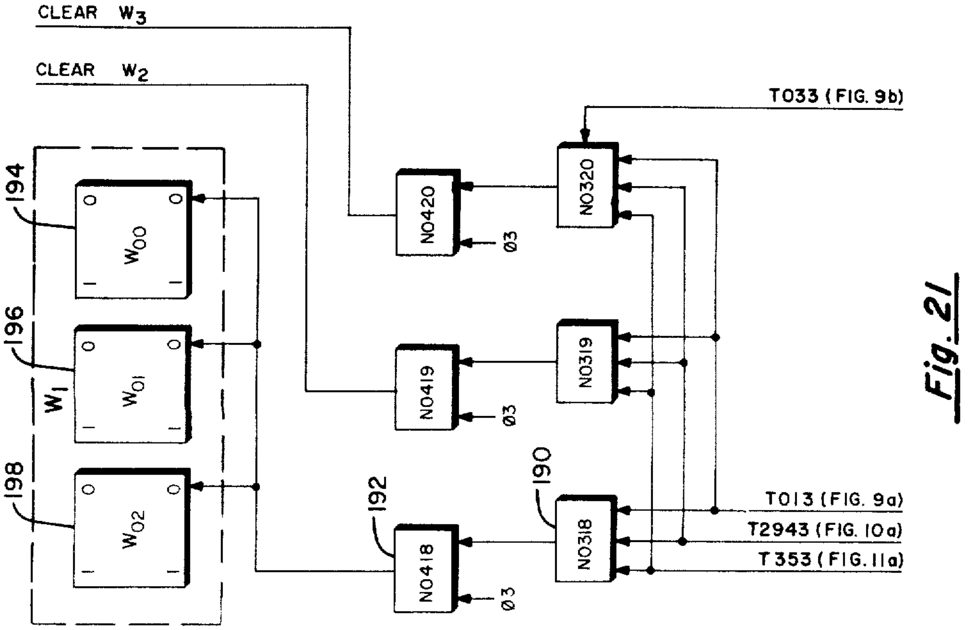

The clearing of the registers in response to the "clear" control signals will likewise be described by describing in detail the means for clearing a specific register in response to its corresponding clearing control signal since the illustrative means for clearing is similar for all of the registers. In FIG. 21, NOR circuit 190 labeled N0318 has three control signal lines as inputs thereto, one from each of the three sequences $T_0$, $T_2$ and $T_3$. Upon the activation of any of said control signal lines NOR circuit 190 in response thereto outputs a "0" signal level as an input to NOR circuit 192 labeled N0418. At clock phase 3 N0418 outputs a signal of the "1" signal level which is transmitted to the 0 input side of flip-flops 194, 196 and 198 to clear said flip-flops. These latter flip-flops are the three lowest order stages in the $W_1$ register, stages 0, 1 and 2. Although the $W_1$ register in the embodiment described herein is an 18 bit register, the clearing of the three lowest order stages in response to the Clear $W_1$ control signal is sufficient to illustrate the means for clearing, since the remaining fifteen stages in the $W_1$ register would similarly receive inputs from the output of NOR circuit 192 into their 0 input sides in order to be cleared. It should be pointed out at this juncture that even though a single NOR circuit, 192, is shown to provide the signal to clear all the stages of the $W_1$ register, that in the event that the power limitations on a given NOR circuit are such that a single NOR circuit cannot provide sufficient signal to a large plurality of flip-flops, a plurality of NOR circuits may be parallel connected with NOR circuit 192 in order to obtain sufficient power. In a similar manner the $F_0$, $F_1$, P and R registers are cleared in response to their corresponding control signals, respectively, Clear $F_0$, Clear $F_1$, Clear P and Clear R in FIG. 22 and the $W_2$ and $W_3$ registers are cleared by the Clear $W_2$ and Clear $W_3$ signals of FIG. 21.

In FIG. 19 there is shown the means for implementing the required function in response to the control signals of 101 to $S_0$ and 103 to $S_0$. The control signal 103 to $S_0$ from the NOR circuit H2241 in the $T_2$ Sequence provides a "1" signal level at the input to NOR circuits 194, 196 and 198, respectively, labeled N3906, N3806 and N1906. In response thereto the latter NOR circuits provide NOR circuits 200, 202 and 204, respectively, labeled N4906, N4806 and N2906 corresponding "0" signal input signals so that the latter NOR circuits in turn develop "1" signal level outputs. The output from N4806 provides a signal into the 1 input side of flip-flop 180 to set the lowest order bit in the $S_0$ register, $S_{00}$, to the "1" state. In a like manner N4906 sets flip-flop 182, $S_{01}$, and NOR circuit N2906 sets flip-flop 206, $S_{06}$. This results in the coded permutations of the contents of the $S_0$ register being 103 octal. From the figure it can be seen that in response to the control signal from H2451 and H2551 in the $T_2$ Sequence that only bits $S_{06}$ and $S_{00}$ are set so that the $S_0$ register will then contain the coded permutations equal to octal 101. The above, of course, assumes that prior to the development of the control signals the $S_0$ register is cleared by means not shown.

The means for setting the $W_1$ register to $-1$ and for setting the $W_3$ register to $-1$ or $+1$ in response to the appropriate control signal are not shown in the figures. Means for accomplishing this are well known in the art and could take the form of, as an illustration, clearing all of the bits in the $W_3$ register while setting the lowest order bit to 1 in response to the $+1$ to $W_3$ control signal and clearing the lowest order bit in the $W_3$ register while setting all the other bits therein in response to the control signal of $-1$ to $W_3$. The latter, of course, can similarly be used in conjunction with setting the $W_1$ register to $-1$.

There remains to be described the means responsive to those control signals which are utilized to effect the proper conditioning signals which were previously described.

The P Designator Flip-Flop 158 in FIG. 15, labeled G152, receives an input to its 1 input side from H0441 in the $T_0$ Sequence which sets the flip-flop in response to the Set P Designator Flip-Flop control signal. The input to the 0 input side from H3374 in the $T_3$ Sequence serves to clear the flip-flop in response to the Clear P Designator Flip-Flop control signal.

In FIG. 16 the $Z_1$ to $F_0$ Flip-Flop 152, labeled G112, is set in response to the control signal from H0341 in the $T_0$ Sequence passing through the NOR circuit 108, labeled G0267, and NOR circuit 110, labeled G0261. The latter has a second input of the phase 1 clock signal and at the proper clock phase time provides a "1" signal to the 1 input side of the G112 flip-flop to set it. The 0 input side of the G112 flip-flop 152 receives an input from T0223 in the $T_0$ Sequence in response to which it is cleared. The $Z_1$ to X Flip-Flop 150, labeled G111 is set in a similar manner from H0541 in the $T_0$ Sequence and is cleared by the same control signal utilized to clear the $Z_1$ to $F_0$ Flip-Flop.

The Interrupt Request Flip-Flop 142 in FIG. 14 labeled G148, is set in response to an Interrupt Request signal which is transmitted from the Input-Output section of the computer. The Clear Interrupt Request Flip-Flop signal to the 0 input side of flip-flop 142 is likewise transmitted at the proper time from the Input-Output section. The Interrupt Flip-Flop 154, labeled G149 in FIG. 14 is set in response to a control signal from H0243 in the $T_0$ Sequence. It is cleared, as shown in the figure, when the Interrupt Request Flip-Flop 142 is cleared by an output signal from the 0 output side of said latter flip-flop providing a first input to NOR circuit 212, labeled G0249, which combines with a phase 3 clock signal to provide a clearing signal into the 0 input side of the Interrupt Flip-Flop 154. The Repeat Set-Up Flip-Flop 140 of FIG. 13, labeled G142, is set by a control signal from T0514 in the $T_0$ Sequence and is cleared in response to the control signal developed by T2283 in the $T_2$ Sequence. The Repeat Flip-Flop 136 labeled G141 is set by the same signal which clears the RSU Flip-Flop and is cleared by the control signal developed by T2441 in the $T_2$ Sequence. The Repeat Terminate Flip-Flop 150, labeled G140 in FIG. 13, is set by the control signal from H3274 in the $T_3$ Sequence or from H0243 in the $T_0$ Sequence and is cleared by the control signal from T2551 in the $T_2$ Sequence. The Quick Exit Flip-Flop 156, labeled G158, in FIG. 17 is set by the control signal from H2253 in the $T_2$ Sequence and is cleared by any appropriate signal developed in the $T_0$ Sequence.

The foregoing specification includes a description of means for discontinuing the repeating function in response to two different conditions, namely repeat count reduced to 0 or an interrupt. These two only were described since they are common to all of the various types of repeating functions that can be incorporated under the teachings of the instant invention. For example, in the illustrative instruction word utilized to describe the instant invention the third condition for terminating the repeating function would be when the comparator is equal to an operand. However, in a different type of instruction word such as one calling for REPEAT WITHIN LIMITS test, where the magnitude of a comparator is compared to the magnitudes of two different operands to see if it lies within said latter magnitudes, the condition for terminating the repeating function would be where such condition does exist. In other words, the third condition for terminating the repeating operation is dependent upon the particular function and is not common to all repeat functions.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. In a digital computer operating from an internally stored program of machine instruction words and operands, with said program including a repeat instruction word, the combination comprising first and second addressable memory sections storing program instruction words and operand words with the memory accessing time of the former being no greater than one-third that of the latter; a function register associated with said first memory section for normally receiving each instruction word in program sequence; an operand processing section, a temporary storage register for holding the memory address of the next sequential program instruction during the normal course of program operation; a translator coupled to the function register for translating the function code portion of the instruction word; and a control circuit for controlling computer operations in response to the receipt of a repeat instruction word acquired in the normal course of program operation, including a first sequence controlling circuit for initiating computer operations in predetermined sequential order, means connected to said first sequence controlling circuit for transmitting the address of the next sequential normal program instruction from the temporary storage register to a first pre-selected storage location in the first memory section whereby the normal program operation is discontinued, means responsive to said first sequencing controlling circuit for subsequently obtaining a repeat count value from a second pre-selected storage location in said first memory section, means for transmitting said repeat count value to the temporary storage register, means for obtaining a fixed operand from a storage location designated by a first address-representing code portion of the repeat instruction word, and means for transmitting said fixed operand to the operand processing section; second sequence controlling circuit for enabling means for repetitively obtaining respectively different operands from storage locations in the second memory section as designated in part by a second address-representing code portion of the repeat instruction word and for transmitting each of said different operands in turn to said operand processing section; third sequence controlling circuit for enabling in predetermined sequential order, concurrently with said second sequence controlling circuit, means for subtracting one from the contents of said temporary storage register for each different operand obtained in response to said second sequence controlling means, and detecting means associated with said subtracting means for sensing when said contents are equal to zero; means responsive in part to the translation of the function code portion of the repeat instruction word for activating each of said sequence controlling circuits in predetermined sequential order; means responsive to the sensing of said register contents equal-to-zero for deactivating said second sequence controlling circuit and for initiating said first sequence controlling circuit; said first sequence controlling circuit further including means responsive to said latter initiating means for enabling in predetermined sequential order, means for obtaining the address of the next sequential normal program instruction from said first pre-selected storage location and means for transmitting said latter address to said temporary storage register for reinitiating the normal program operation.

2. Computer control circuit as in claim 1 further including: means adapted to sense the occurrence of a computer-generated interrupt condition; first means responsive to said interrupt sensing means for deactivating said second sequence controlling circuit if it has not previously been deactivated; second means responsive to said interrupt sensing means for initiating said first sequence controlling circuit; said first sequence controlling circuit still further including means responsive to said second means for enabling in predetermined sequential order, means for transmitting said repeat count value from said temporary storage register to said second pre-selected storage location in the first memory section, means for obtaining the address of the next sequential normal program instruction from said first pre-selected storage location in the first memory section, and means for transmitting said address to said temporary storage register; and third means responsive to said interrupt sensing means for enabling said subtracting means after said next sequential program address has been transmitted to the temporary storage register whereby said address value is reduced by one.

3. A digital computer operated by an internally stored program of machine instruction words and operands, in combination:

(A) A first memory section storing program instruction words and operands at addressable storage locations;

(B) A second memory section for storing operands and data at addressable storage locations, said second memory section having a memory accessing time no greater than one-third that of said first memory section;

(C) Temorary storage register for holding the address of the next instruction during the normal course of program operation;

(D) A function register associated with said first memory section for holding each of the respective program instruction words as they are obtained from said first memory section;

(E) Translating means coupled to said function register for detecting the occurrence of a repeat instruction word;

(F) An operand processing section;

(G) First control circuit responsive to said repeat-instruction-word detecting means including, (1) means for transferring the address of the next sequential program instruction from said temporary storage register to a first pre-selected location in said second memory section whereby the normal program operation is discontinued;

(2) means for transferring a repeat count value from a second pre-selected location in said second memory section to said temporary storage register; and (3) means for transferring a fixed operand from a location in said second memory section as designated by a first address-representing code portion of the repeat instruction word to said operand processing section;

(H) Means responsive to said translating means for repetitively transferring respectively different operands from locations in said first memory section as designated in part by a second address-representing code portion of the repeat instruction word to said operand processing section;

(I) Means for decrementing by one the repeat count value in said temporary storage register for each transfer of said respectively different operands;

(J) Means associated with said decrementing means for sensing when said repeat count value is equal to zero; and (K) Means responsive to said latter sensing means for re-initiating the normal program operation.

4. A digital computer as in claim 3, further including:

(L) Means for sensing the occurrence of an interrupt condition;

(M) Second control circuit responsive to said interrupt sensing means, including, (1) means for interrupting the repetitive transfer of operands, (2) means for transferring the repeat count value from said temporary storage register to said second pre-selected storage location, (3) means for transferring the address of the next sequential normal program instruction from said first pre-selected storage location to said temporary storage register, and (4) means for decrementing said address by one, whereby said repetitive transfers can be reinitiated at the same juncture where interrupted.

5. In a digital computer operating from an internally stored program of machine instruction words with said program including a repeat instruction, the combination comprising: first and second addressable memory means for storing program instruction words and operands, the memory accessing time of the first memory means being no greater than one-third that of the second memory means; a function register connected to receive instruction words in program sequence from said first memory means; an operand processing section; a storage register adapted to receive and temporarily store the memory address of the next sequential program instruction during the normal course of program execution; signal translating means connected to said function register for producing electrical signals unique to the particular instruction words stored in said function register; sensing means connected to receive electrical signals from said translator for sensing a repeat instruction word; control signal generating means responsively enabled by the output from said sensing means for effecting the storage of the address of the next sequential program instruction contained in said storage register at a first predetermined location in said first memory means; means responsive to an output signal from said control signal generating means for obtaining a repeat count value from a preselected storage location in said first memory and placing it in said storage register; means including said control signal generating means and said operand processing section for repetitively executing computer operations specified by the function code of said repeat instruction word; means for altering the repeat count value by a predetermined value for each of said repetitive execution; and further circuit means included in said control signal generating means responsive to a computer interrupt signal for transferring the current repeat count value from said storage register to said second preselected location in said first memory means and for transferring the address of the next sequential program instruction decremented by one from said preselected memory location to said storage register, whereby upon cessation of the computer interrupt signal, the repetitive operation is reinitiated at the same juncture at which it had been interrupted.

6. In a digital computer operating from an internally stored program of machine instruction words and operands, with said program including a repeat instruction, the combination comprising: first and second addressable memory means adapted to store program instruction words and operands with the memory accessing time of the first memory means being no greater than one-third that of said second memory means; a function register connected to said first memory means and adapted to receive each instruction word in program sequence; at least one further temporary storage register for normally holding the memory address of the next sequential program instruction during the normal course of program operation; an operand processing means; means coupled to said function register for producing output signals indicative of the presence of a repeat instruction word in said function register; control means including means responsive to said output signal for effecting the storage of the contents of said temporary storage register in a predetermined location in said second memory means, further means responsive to said output signal for reading out a repeat count value from said second memory means into said temporary storage register; means for repetitively enabling said operand processing means specified by the function code of said repeat instruction, means responsive to an interrupt signal occurring during the repetitive cycling of said operand processing means for terminating said repetitive cycling and for storing said repeat count value at a preselected addressable location in said second memory means; and means responsive to the termination of said interrupt signal for reaccessing said repeat instruction into said function register and said repeat count value into said temporary storage register, such that said repeat function is reinitiated at the point at which said interrupt signal occurred.

References Cited in the file of this patent

UNITED STATES PATENTS

| | | |
|---|---|---|
| 2,959,351 | Hamilton et al. | Nov. 8, 1960 |
| 3,017,092 | Rent et al. | Jan. 16, 1962 |
| 3,079,082 | Scholten et al. | Feb. 26, 1963 |

OTHER REFERENCES

"Arithmetic Computations in Digital Computers" (Richards), Nostrand, 1955 (pp. 348–349 relied on).

UNITED STATES PATENT OFFICE

CERTIFICATE OF CORRECTION

Patent No. 3,168,724 February 2, 1965

Duane H. Anderson

It is hereby certified that error appears in the above numbered patent requiring correction and that the said Letters Patent should read as corrected below.

Column 1, line 49, for "woul dinclude" read -- would include --; column 2, line 57, for "positoin" read -- position --; column 9, line 14, for "uppe rand" read -- upper and --; column 13, line 45, for "signals," read -- signals. --; line 57, after "2/3" insert -- a --; column 14, line 13, for "seting" read -- setting --; column 23, line 47, for "sceond" read -- second --; column 25, line 45, after "the", first occurrence, insert -- a --; column 29, line 29, for "Sail" read -- Said --; column 30, line 29, for "instructoin" read -- instruction --; line 50, for "for", second occurrence, read -- from --; same column 30, line 74, for "interrput" read -- interrupt --; column 31, line 23, after "Sequence" insert -- results --; column 32, line 17, for "fiip-flops" read -- flip-flops --; column 35, line 58, for "signal" read -- signals --.

Signed and sealed this 14th day of September 1965.

(SEAL)
Attest:

ERNEST W. SWIDER
Attesting Officer

EDWARD J. BRENNER
Commissioner of Patents